United States Patent
Du et al.

(10) Patent No.: US 7,528,520 B2
(45) Date of Patent: *May 5, 2009

(54) ELECTRIC MOTOR HAVING A FIELD ASSEMBLY WITH SLOT INSULATION

(75) Inventors: Hung T. Du, Reisterstown, MD (US);
Brandon L. Verbrugge, Prague (CZ);
Earl M. Ortt, Bel Air, MD (US);
Michael J. Agnes, Bel Air, MD (US);
Michael A. Zemlok, Towson, MD (US);
Robert G. Kusmierski, Felton, PA (US);
David J. Smith, Glen Burnie, MD (US)

(73) Assignee: Black & Decker Inc., Newark, DE (US)

( * ) Notice: Subject to any disclaimer, the term of this patent is extended or adjusted under 35 U.S.C. 154(b) by 246 days.

This patent is subject to a terminal disclaimer.

(21) Appl. No.: 11/542,826

(22) Filed: Oct. 4, 2006

(65) Prior Publication Data

US 2007/0024151 A1    Feb. 1, 2007

Related U.S. Application Data

(62) Division of application No. 10/934,333, filed on Sep. 3, 2004, now Pat. No. 7,146,706.

(60) Provisional application No. 60/500,384, filed on Sep. 5, 2003, now abandoned, provisional application No. 60/546,243, filed on Feb. 20, 2004, now abandoned.

(51) Int. Cl.
*H02K 1/18*    (2006.01)

(52) U.S. Cl. ........................... 310/218; 310/215

(58) Field of Classification Search ................ 310/215, 310/216, 217, 218
See application file for complete search history.

(56) References Cited

U.S. PATENT DOCUMENTS 463,693  A    11/1891   Storey (Continued)

FOREIGN PATENT DOCUMENTS

DE    233 811    4/1911

(Continued)

OTHER PUBLICATIONS

Communication from UK Patent Office re: counterpart application GB0419661.4.

(Continued)

*Primary Examiner*—Nguyen N Hanh
(74) *Attorney, Agent, or Firm*—Harness, Dickey & Pierce, P.L.C.

(57) ABSTRACT

An electric motor has a field assembly, such as a stator, for a dynamoelectric machine has field coils that are wound to a net shape. Lead wires are brought out from the ends of each field coil. The field coils are insulated with insulating sleeves or insulating slot liners. The field coils are assembled with stator core pieces, such as pole pieces and return path pieces, into the stator. The stator core pieces are formed prior to being assembled with the field coils. In an aspect of the invention, the pole pieces and return path pieces are separately formed and then assembled together with the field coils, which have also been separately formed.

4 Claims, 15 Drawing Sheets

U.S. PATENT DOCUMENTS

| | | |
|---|---|---|
| 771,260 A | 10/1904 | Meston et al. |
| 1,314,132 A | 8/1919 | Dorsey |
| 1,496,037 A | 6/1924 | Varley |
| 1,506,746 A | 9/1924 | Griffith |
| 1,654,840 A | 1/1928 | Shivers |
| 2,064,090 A | 12/1936 | Sullivan et al. |
| 2,251,673 A | 8/1941 | Gillen |
| 2,291,013 A | 7/1942 | Wheeler |
| 2,431,867 A | 12/1947 | Galla |
| 2,451,921 A | 10/1948 | Cook |
| 2,487,258 A | 11/1949 | Morris |
| 2,502,185 A | 3/1950 | Thomas |
| 2,550,501 A | 4/1951 | Sims |
| 2,615,068 A | 10/1952 | Radice |
| 2,631,251 A | 3/1953 | Spielman |
| 2,712,084 A | 6/1955 | Bridenbaugh |
| 2,778,964 A | 1/1957 | Balke |
| 2,919,357 A | 12/1959 | Lung |
| 2,982,873 A | 5/1961 | Simmons et al. |
| 2,989,657 A | 6/1961 | Sampson |
| 2,999,176 A | 9/1961 | Lindstrom et al. |
| 3,021,443 A | 2/1962 | Tamm |
| 3,045,133 A | 7/1962 | Aske |
| 3,122,667 A | 2/1964 | Baciu |
| 3,151,262 A | 9/1964 | Howard et al. |
| 3,161,796 A | 12/1964 | Annis et al. |
| 3,187,211 A | 6/1965 | Ve Nard |
| 3,339,097 A | 8/1967 | Dunn |
| 3,359,520 A | 12/1967 | Foerster |
| 3,382,573 A | 5/1968 | Mantelet |
| 3,440,460 A | 4/1969 | Postema |
| 3,443,136 A | 5/1969 | Freeman et al. |
| 3,443,137 A | 5/1969 | McElroy |
| 3,502,922 A | 3/1970 | Welker |
| 3,515,923 A | 6/1970 | Clizbe et al. |
| 3,519,862 A | 7/1970 | Walker |
| 3,549,926 A | 12/1970 | Pentland |
| 3,577,851 A | 5/1971 | Detheridge et al. |
| 3,590,208 A | 6/1971 | Martini et al. |
| 3,600,801 A | 8/1971 | Larsen et al. |
| 3,610,784 A | 10/1971 | Rundell |
| 3,643,118 A | 2/1972 | Ichiki et al. |
| 3,644,767 A | 2/1972 | Kasargod et al. |
| 3,646,374 A | 2/1972 | Jordan et al. |
| 3,652,879 A | 3/1972 | Plunkett et al. |
| 3,679,926 A | 7/1972 | Simmonds et al. |
| 3,694,903 A | 10/1972 | Diming |
| 3,710,437 A | 1/1973 | Kipple et al. |
| 3,735,169 A | 5/1973 | Balke et al. |
| 3,748,511 A | 7/1973 | Crabb |
| 3,748,512 A | 7/1973 | Crabb et al. |
| 3,748,714 A | 7/1973 | Kieffer |
| 3,797,106 A | 3/1974 | Costello |
| 3,802,066 A | 4/1974 | Barrett |
| 3,809,938 A | 5/1974 | Sjoberg et al. |
| 3,826,941 A | 7/1974 | Folmar |
| 3,848,331 A | 11/1974 | Pavlik et al. |
| 3,852,137 A | 12/1974 | Balke et al. |
| 3,861,026 A | 1/1975 | Swaim |
| 3,866,014 A | 2/1975 | Waller |
| 3,922,575 A | 11/1975 | Sauer |
| 3,932,928 A | 1/1976 | King |
| 3,983,435 A | 9/1976 | Sims |
| 4,003,128 A | 1/1977 | Dochterman |
| 4,037,312 A | 7/1977 | Deis |
| 4,048,527 A | 9/1977 | Hallerback et al. |
| 4,071,788 A | 1/1978 | Martin et al. |
| 4,087,712 A | 5/1978 | Mosimann et al. |
| 4,095,627 A | 6/1978 | Lonseth et al. |
| 4,107,559 A | 8/1978 | Patel |
| 4,131,988 A | 1/1979 | Finegold |
| 4,160,926 A | 7/1979 | Cope et al. |
| 4,182,026 A | 1/1980 | Searle |
| 4,263,524 A | 4/1981 | Diederichs |
| 4,312,387 A | 1/1982 | Finegold |
| 4,370,578 A | 1/1983 | Tilse |
| 4,392,070 A | 7/1983 | Zdaniewski |
| 4,425,519 A * | 1/1984 | Balke et al. .................. 310/45 |
| 4,427,740 A | 1/1984 | Stackhouse et al. |
| 4,427,907 A | 1/1984 | Flick et al. |
| 4,433,472 A | 2/1984 | Andoh et al. |
| 4,446,393 A | 5/1984 | Finegold |
| 4,469,967 A | 9/1984 | Grierson et al. |
| 4,520,965 A | 6/1985 | Kimura et al. |
| 4,533,320 A | 8/1985 | Piekarsky |
| 4,562,164 A | 12/1985 | Miyazaki et al. |
| 4,612,702 A | 9/1986 | Wheeler |
| 4,624,884 A | 11/1986 | Harada et al. |
| 4,649,308 A | 3/1987 | Kranzler |
| 4,665,335 A | 5/1987 | Shimozono |
| 4,698,539 A | 10/1987 | Workman |
| 4,703,211 A | 10/1987 | Yazaki et al. |
| 4,712,035 A | 12/1987 | Forbes et al. |
| 4,781,986 A | 11/1988 | Alvino |
| 4,816,710 A | 3/1989 | Silvaggio et al. |
| 4,833,356 A | 5/1989 | Bansal et al. |
| 4,882,832 A | 11/1989 | Lewis |
| 4,893,041 A | 1/1990 | Snider et al. |
| 4,922,165 A | 5/1990 | Crawford et al. |
| 4,947,065 A | 8/1990 | Ward et al. |
| 4,950,438 A | 8/1990 | Nakamura et al. |
| 4,963,776 A | 10/1990 | Kitamura |
| 4,968,911 A | 11/1990 | Denk |
| 4,975,611 A | 12/1990 | Rochester |
| 4,993,290 A | 2/1991 | Obradovic |
| 4,994,697 A | 2/1991 | Santandrea |
| 5,015,904 A | 5/1991 | Kleemann |
| 5,045,742 A | 9/1991 | Armstrong et al. |
| 5,061,088 A | 10/1991 | Sigurdsson |
| 5,068,563 A | 11/1991 | Cummings |
| 5,099,159 A | 3/1992 | Liptak et al. |
| 5,099,568 A | 3/1992 | Santandrea |
| 5,115,556 A | 5/1992 | Gavrilidis et al. |
| 5,182,848 A | 2/1993 | Wheeler |
| 5,239,221 A | 8/1993 | Juan |
| 5,239,743 A | 8/1993 | Santandrea |
| 5,256,926 A | 10/1993 | Hagenlocher et al. |
| 5,304,884 A | 4/1994 | Kitajima et al. |
| 5,341,561 A | 8/1994 | Schorm et al. |
| 5,402,028 A | 3/1995 | Koeber et al. |
| 5,403,371 A | 4/1995 | Engdahl et al. |
| 5,460,503 A | 10/1995 | Kitajima et al. |
| 5,480,469 A | 1/1996 | Storstrom et al. |
| 5,493,162 A | 2/1996 | Wuerth et al. |
| 5,528,822 A | 6/1996 | Ponzio et al. |
| 5,536,985 A | 7/1996 | Ward et al. |
| 5,628,951 A | 5/1997 | Kitajima et al. |
| 5,631,431 A | 5/1997 | Andersson |
| 5,634,258 A | 6/1997 | Onodera et al. |
| 5,664,317 A | 9/1997 | Ponzio et al. |
| 5,691,591 A | 11/1997 | McCann |
| 5,698,922 A | 12/1997 | Halter |
| 5,698,923 A | 12/1997 | Scherzinger et al. |
| 5,703,426 A | 12/1997 | Ueno et al. |
| 5,727,307 A | 3/1998 | Gstohl et al. |
| 5,763,978 A | 6/1998 | Uchida et al. |
| 5,786,651 A | 7/1998 | Suzuki |
| 5,806,169 A | 9/1998 | Trago et al. |
| 5,814,412 A | 9/1998 | Terada et al. |
| 5,821,661 A | 10/1998 | Wissmach et al. |
| 5,859,486 A | 1/1999 | Nakahara et al. |
| 5,939,102 A | 8/1999 | George, Jr. |
| 5,955,814 A | 9/1999 | Fujiwara |
| 5,977,679 A | 11/1999 | Miller et al. |

| | | | |
|---|---|---|---|
| 5,986,377 A | 11/1999 | Yamada et al. | |
| 5,990,247 A | 11/1999 | Terada et al. | |
| 5,995,814 A | 11/1999 | Yeh | |
| 6,034,461 A | 3/2000 | Sun | |
| 6,057,625 A | 5/2000 | Stockman et al. | |
| 6,058,593 A | 5/2000 | Siess | |
| 6,069,421 A | 5/2000 | Smith et al. | |
| 6,075,304 A | 6/2000 | Nakatsuka | |
| 6,107,718 A | 8/2000 | Schustek et al. | |
| 6,121,711 A | 9/2000 | Nakahara et al. | |
| 6,127,761 A | 10/2000 | Shen et al. | |
| 6,147,430 A | 11/2000 | Kusase et al. | |
| 6,157,102 A | 12/2000 | Suzuki et al. | |
| 6,167,610 B1 | 1/2001 | Nakahara et al. | |
| 6,201,321 B1 | 3/2001 | Mosciatti et al. | |
| 6,202,286 B1 | 3/2001 | Schustek et al. | |
| 6,219,900 B1 | 4/2001 | Suzuki | |
| 6,226,856 B1 | 5/2001 | Kazama et al. | |
| 6,227,822 B1 | 5/2001 | Chen | |
| 6,232,681 B1 | 5/2001 | Johnston et al. | |
| 6,232,693 B1 | 5/2001 | Gierer et al. | |
| 6,236,173 B1 | 5/2001 | Meyer | |
| 6,242,836 B1 | 6/2001 | Ishida et al. | |
| 6,261,514 B1 | 7/2001 | Lindberg et al. | |
| 6,300,702 B1 | 10/2001 | Jack et al. | |
| 6,323,571 B1 | 11/2001 | Nakahara et al. | |
| 6,348,080 B1 | 2/2002 | Arvidsson et al. | |
| 6,353,297 B1 | 3/2002 | Meyer | |
| 6,362,544 B2 | 3/2002 | Johnston et al. | |
| 6,362,553 B1 | 3/2002 | Nakahara et al. | |
| 6,369,483 B1 | 4/2002 | Hill | |
| 6,389,678 B1 | 5/2002 | Ackermann et al. | |
| 6,414,413 B1 | 7/2002 | Arai et al. | |
| 6,425,176 B1 | 7/2002 | Ozawa et al. | |
| 6,436,166 B2 | 8/2002 | Arvidsson et al. | |
| 6,439,862 B2 | 8/2002 | Chen | |
| 6,448,685 B1 | 9/2002 | Mayer et al. | |
| 6,452,303 B1 | 9/2002 | Marioni | |
| 6,472,792 B1 | 10/2002 | Jack et al. | |
| 6,476,533 B2 | 11/2002 | Akutsu et al. | |
| 6,485,579 B1 | 11/2002 | Nillius et al. | |
| 6,485,677 B1 | 11/2002 | Johansson et al. | |
| 6,489,697 B1 | 12/2002 | Ozawa et al. | |
| 6,503,444 B1 | 1/2003 | Andersson | |
| 6,504,284 B1 | 1/2003 | Kazama et al. | |
| 6,507,991 B1 | 1/2003 | Ozawa et al. | |
| 6,509,665 B1 | 1/2003 | Nishiyama et al. | |
| 6,525,437 B1 | 2/2003 | Ozawa et al. | |
| 6,597,080 B2 | 7/2003 | Soderberg | |
| 6,643,910 B2 | 11/2003 | Kanai et al. | |
| 6,645,416 B2 | 11/2003 | Bock et al. | |
| 6,653,758 B2 | 11/2003 | Tsuneyoshi et al. | |
| 6,661,137 B2 | 12/2003 | Gauthier | |
| 6,683,396 B2 | 1/2004 | Ishida et al. | |
| 6,683,397 B2 | 1/2004 | Gauthier et al. | |
| 6,703,748 B2 | 3/2004 | Arai et al. | |
| 6,707,225 B2 | 3/2004 | Bradfield | |
| 6,713,929 B2 | 3/2004 | Meyer et al. | |
| 6,794,786 B2 | 9/2004 | Enomoto et al. | |
| 6,812,610 B2 | 11/2004 | Kim et al. | |
| 6,822,364 B2 | 11/2004 | Suzuki et al. | |
| 7,078,843 B2 * | 7/2006 | Du et al. ............... 310/218 | |
| 2001/0045687 A1 | 11/2001 | Baumann et al. | |
| 2002/0047425 A1 | 4/2002 | Coupart et al. | |
| 2002/0047446 A1 | 4/2002 | Meyer | |
| 2002/0079779 A1 | 6/2002 | Muszynski | |
| 2002/0079780 A1 | 6/2002 | Muszynski | |
| 2002/0130580 A1 | 9/2002 | Arai et al. | |
| 2002/0135259 A1 | 9/2002 | Eggers et al. | |
| 2002/0146341 A1 | 10/2002 | Mars et al. | |
| 2002/0149281 A1 | 10/2002 | Saint-Michel et al. | |
| 2002/0149282 A1 | 10/2002 | Heidrich | |
| 2002/0171305 A1 | 11/2002 | Coupart et al. |
| 2002/0175587 A1 | 11/2002 | Vollmer |
| 2002/0187000 A1 | 12/2002 | Heier et al. |
| 2003/0038555 A1 | 2/2003 | Ozawa et al. |
| 2003/0071535 A1 | 4/2003 | Wang et al. |
| 2003/0094876 A1 | 5/2003 | Hsu |
| 2003/0127933 A1 | 7/2003 | Enomoto et al. |
| 2003/0160532 A1 | 8/2003 | Suzuki et al. |
| 2003/0160533 A1 | 8/2003 | Suzuki et al. |
| 2004/0021391 A1 | 2/2004 | Jones et al. |
| 2004/0056537 A1 | 3/2004 | Du et al. |
| 2004/0056538 A1 | 3/2004 | Du et al. |

FOREIGN PATENT DOCUMENTS

| | | |
|---|---|---|
| DE | 1 119 999 | 12/1961 |
| DE | 1 880 000 | 10/1963 |
| DE | 1 168 553 | 4/1964 |
| DE | 1 945 459 | 3/1970 |
| DE | 2 021 916 | 11/1971 |
| DE | 28 43 006 | 4/1980 |
| DE | 31 24 098 | 2/1982 |
| DE | 83 28 208 | 6/1984 |
| DE | 214 502 | 10/1984 |
| DE | 33 36 340 | 4/1985 |
| DE | 38 04 728 | 8/1988 |
| DE | 38 42 560 | 6/1990 |
| DE | 40 23 903 | 11/1991 |
| DE | 40 21 591 | 1/1992 |
| DE | 42 13 337 | 10/1993 |
| DE | 42 33 558 | 3/1994 |
| DE | 195 20 332 | 12/1996 |
| DE | 298 00 928 U | 3/1998 |
| DE | 299 17 138 | 1/2000 |
| DE | 199 12 864 | 9/2000 |
| DE | 199 43 783 | 3/2001 |
| DE | 100 55 750 | 12/2001 |
| DE | 202 04 507 U | 6/2002 |
| DE | 102 29 333 | 1/2004 |
| EP | 0 358 805 | 3/1990 |
| EP | 0 154 469 | 4/1990 |
| EP | 0 730 334 | 9/1996 |
| EP | 0 612 139 | 12/1996 |
| EP | 0 748 025 | 12/1996 |
| EP | 0 875 979 | 11/1998 |
| EP | 0 889 575 | 1/1999 |
| EP | 1 073 180 | 1/2001 |
| EP | 1 087 497 | 3/2001 |
| EP | 1 154 544 | 11/2001 |
| EP | 1 235 325 | 8/2002 |
| EP | 1 322 021 | 6/2003 |
| EP | 1 339 158 | 8/2003 |
| EP | 1 351 367 | 10/2003 |
| EP | 1 453 179 | 9/2004 |
| GB | 1 422 541 | 1/1976 |
| GB | 1 596 181 | 8/1981 |
| GB | 2 224 399 | 5/1990 |
| JP | 49-149902 | 12/1974 |
| JP | 56-035646 | 4/1981 |
| JP | 56-61137 | 5/1981 |
| JP | 57-162410 | 10/1982 |
| JP | 57-183035 | 11/1982 |
| JP | 58-25542 | 2/1983 |
| JP | 58-49550 | 4/1983 |
| JP | 59-151859 | 8/1984 |
| JP | 59-175349 | 10/1984 |
| JP | 59-230441 | 12/1984 |
| JP | 60-237836 | 11/1985 |
| JP | 61-030939 | 2/1986 |
| JP | 61-39836 | 2/1986 |
| JP | 61-132059 | 6/1986 |
| JP | 61-210850 | 9/1986 |
| JP | 61-218336 | 9/1986 |
| JP | 62-081944 | 4/1987 |

| | | |
|---|---|---|
| JP | 63-299738 | 12/1988 |
| JP | 63-299745 | 12/1988 |
| JP | 63-299747 | 12/1988 |
| JP | 63-299750 | 12/1988 |
| JP | 01-122343 | 5/1989 |
| JP | 02-146946 | 6/1990 |
| JP | 02-129154 | 10/1990 |
| JP | 03-253247 | 11/1991 |
| JP | 04-056304 | 2/1992 |
| JP | 04-105536 | 4/1992 |
| JP | 04-138044 | 5/1992 |
| JP | 04-259685 | 9/1992 |
| JP | 04-347551 | 12/1992 |
| JP | 05-038103 | 2/1993 |
| JP | 05-184091 | 7/1993 |
| JP | 05-68178 | 9/1993 |
| JP | 05-70150 | 9/1993 |
| JP | 06-006943 | 1/1994 |
| JP | 06-014481 | 1/1994 |
| JP | 06-113491 | 4/1994 |
| JP | 06-253479 | 9/1994 |
| JP | 06-276705 | 9/1994 |
| JP | 08-107645 | 4/1996 |
| JP | 08-163804 | 6/1996 |
| JP | 08-196060 | 7/1996 |
| JP | 08-322177 | 12/1996 |
| JP | 09-023601 | 1/1997 |
| JP | 09-023620 | 1/1997 |
| JP | 09-037493 | 2/1997 |
| JP | 09-056099 | 2/1997 |
| JP | 09-98545 | 4/1997 |
| JP | 09-131003 | 5/1997 |
| JP | 09-149575 | 6/1997 |
| JP | 09-149576 | 6/1997 |
| JP | 09-149605 | 6/1997 |
| JP | 09-149607 | 6/1997 |
| JP | 09-168250 | 6/1997 |
| JP | 09-215230 | 8/1997 |
| JP | 09-219941 | 8/1997 |
| JP | 09-219949 | 8/1997 |
| JP | 09-233778 | 9/1997 |
| JP | 09-234523 | 9/1997 |
| JP | 09-247876 | 9/1997 |
| JP | 09-252556 | 9/1997 |
| JP | 09-308144 | 11/1997 |
| JP | 10-164802 | 6/1998 |
| JP | 10-271715 | 10/1998 |
| JP | 10-271771 | 10/1998 |
| JP | 11-220844 | 8/1999 |
| JP | 11-266557 | 9/1999 |
| JP | 11-332138 | 11/1999 |
| JP | 2000-037050 | 2/2000 |
| JP | 2000-060083 | 2/2000 |
| JP | 2001-112204 | 4/2001 |
| JP | 2001-112205 | 4/2001 |
| JP | 2001-128394 | 5/2001 |
| JP | 2001-128404 | 5/2001 |
| JP | 2002-209345 | 7/2002 |
| JP | 2002-218714 | 8/2002 |
| JP | 2002-369418 | 12/2002 |
| JP | 2003-009434 | 1/2003 |
| JP | 2003-070200 | 3/2003 |
| JP | 2003-134712 | 5/2003 |
| JP | 2003-164090 | 6/2003 |
| JP | 2004-040057 | 2/2004 |
| WO | WO 87/07452 | 12/1987 |
| WO | WO 90/04874 | 5/1990 |
| WO | WO 95/12912 | 5/1995 |
| WO | WO 98/19382 | 5/1998 |
| WO | WO 01/12365 | 2/2001 |
| WO | WO 02/084842 | 10/2002 |

OTHER PUBLICATIONS

Ola Anderson & Alan G. Jack, "Iron Powder in Electrical Machines, Possibilities and Limitations", Advances in Powder Metallurgy and Particulate Materials 2001, 1240-1249, (2001).

* cited by examiner

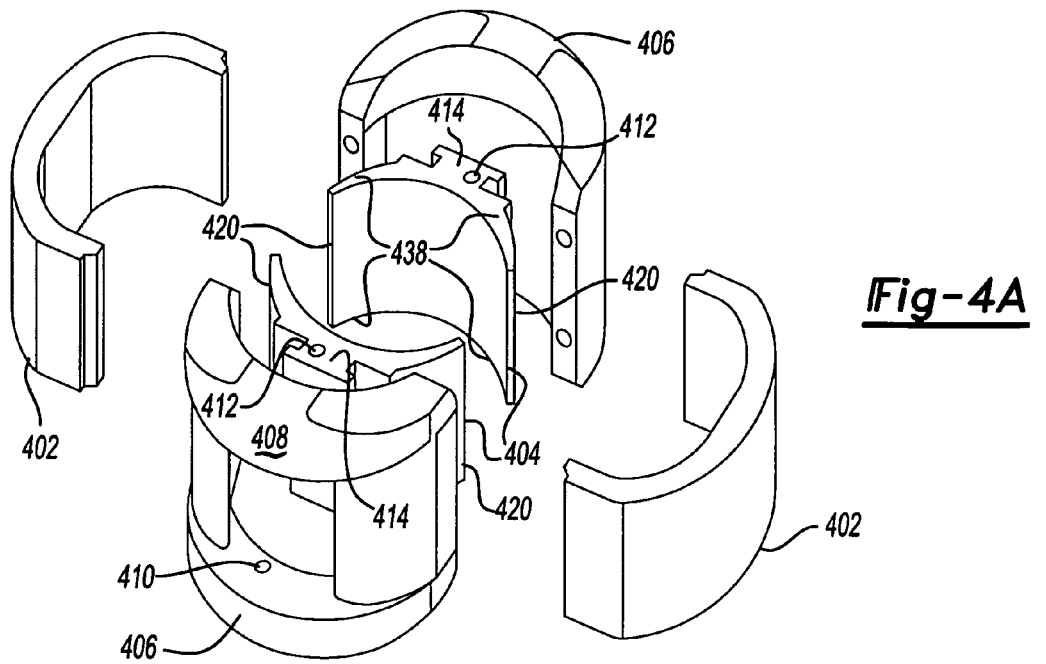

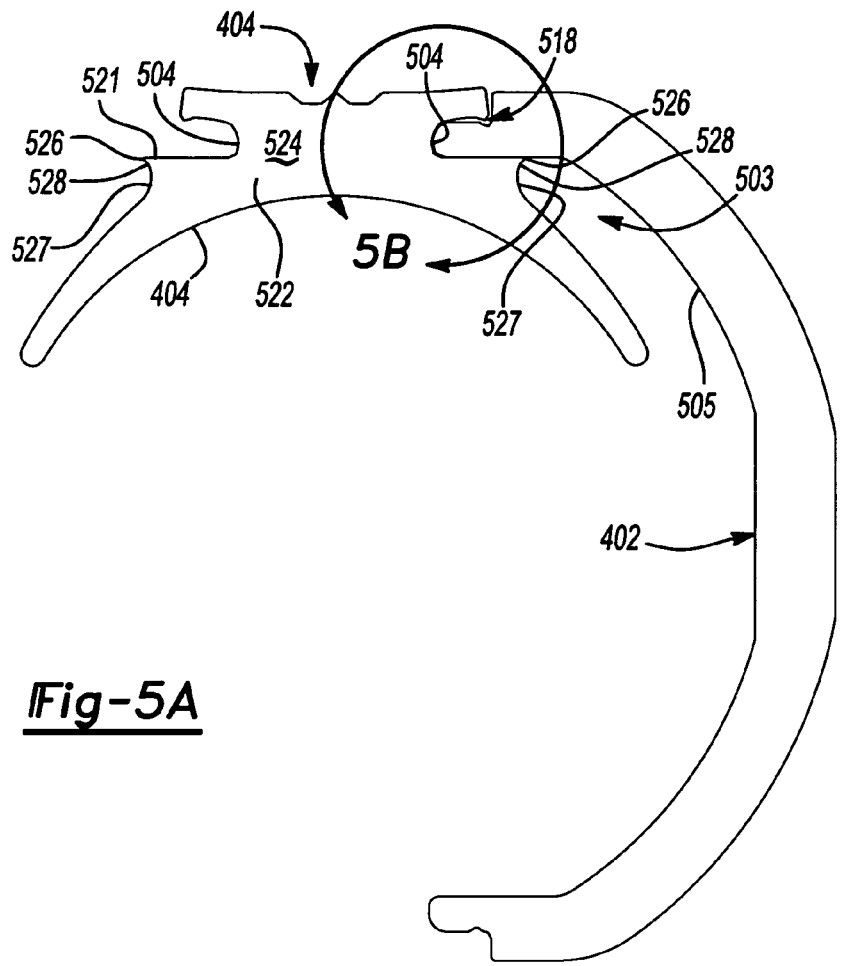
*Fig-5A*
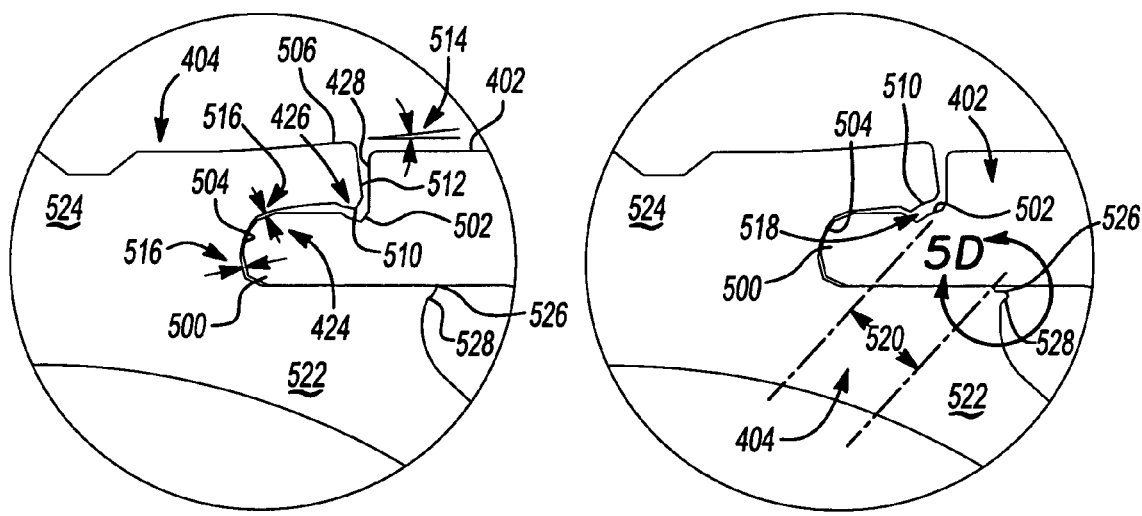
*Fig-5B*   *Fig-5C*

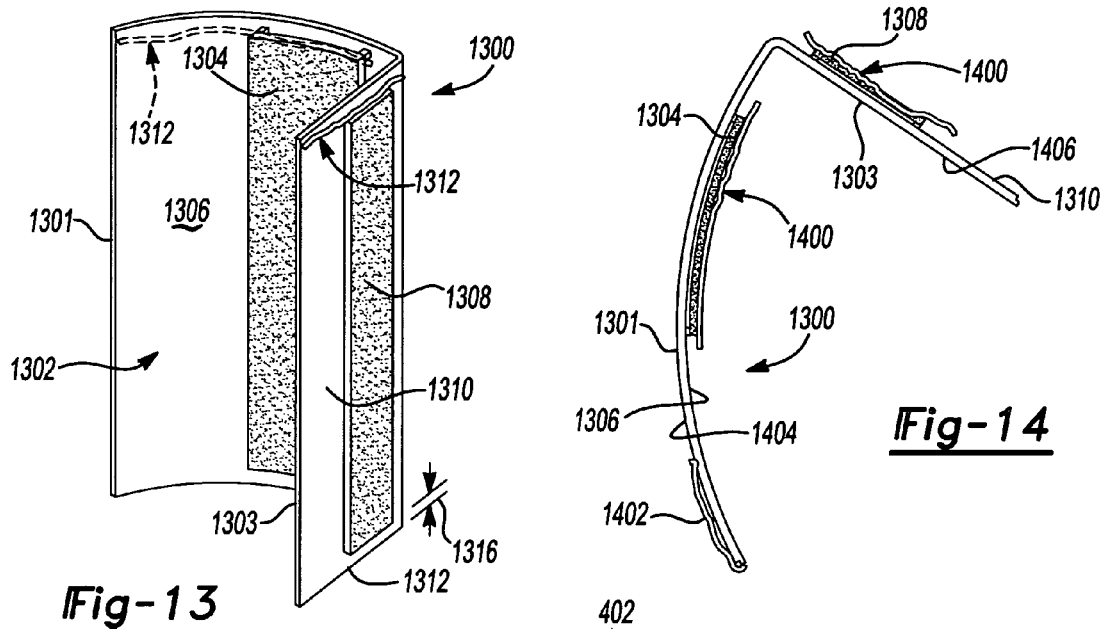
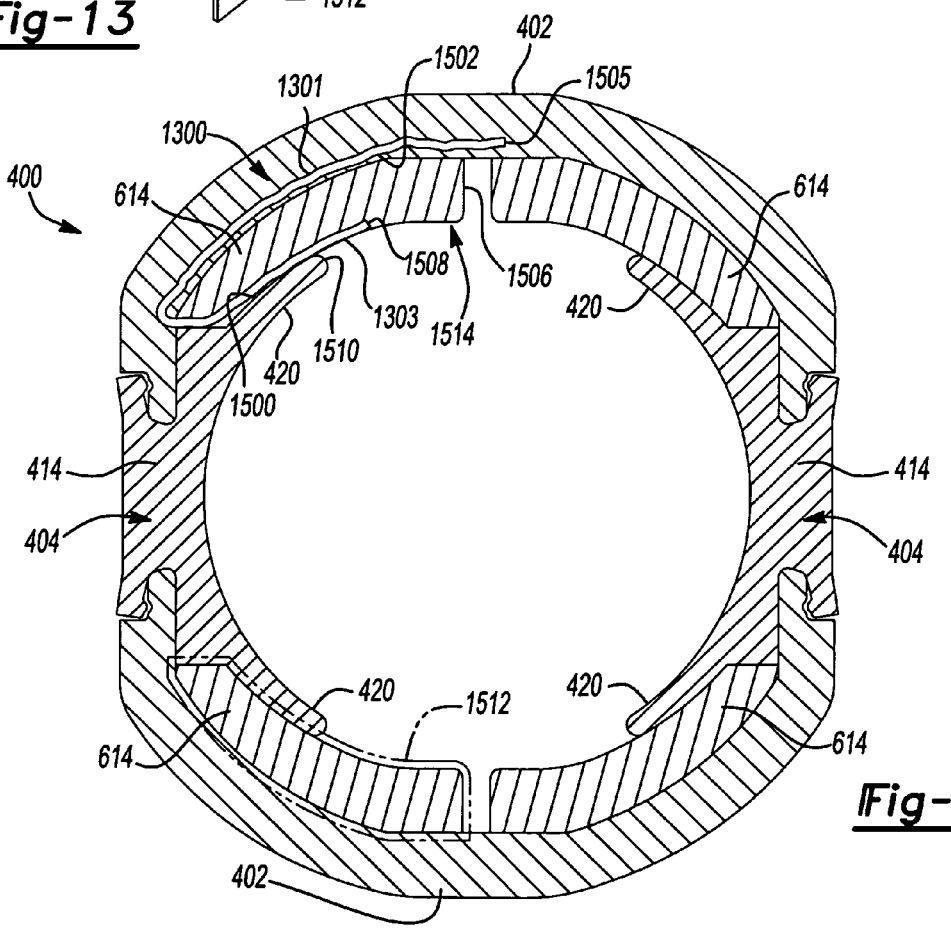

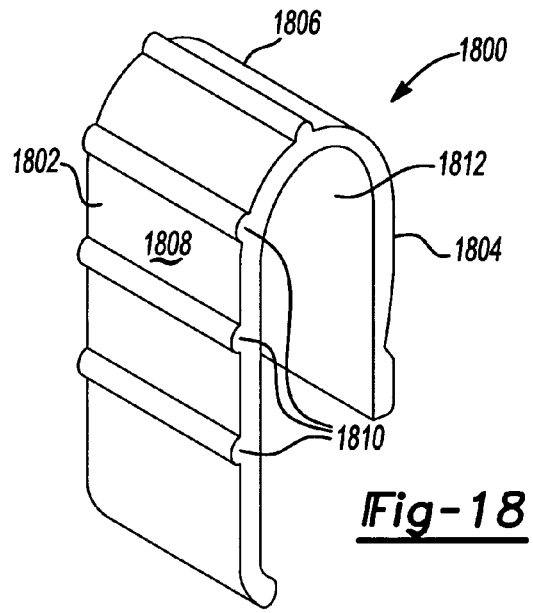
_Fig-18_
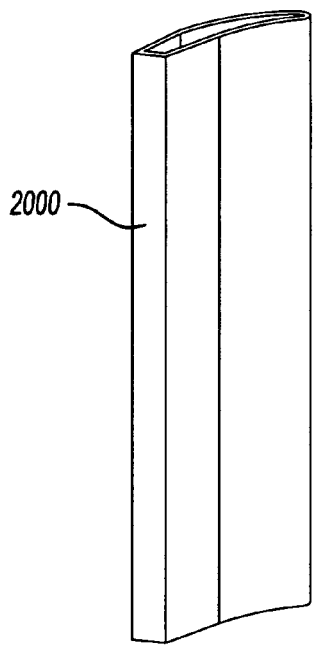
_Fig-20_
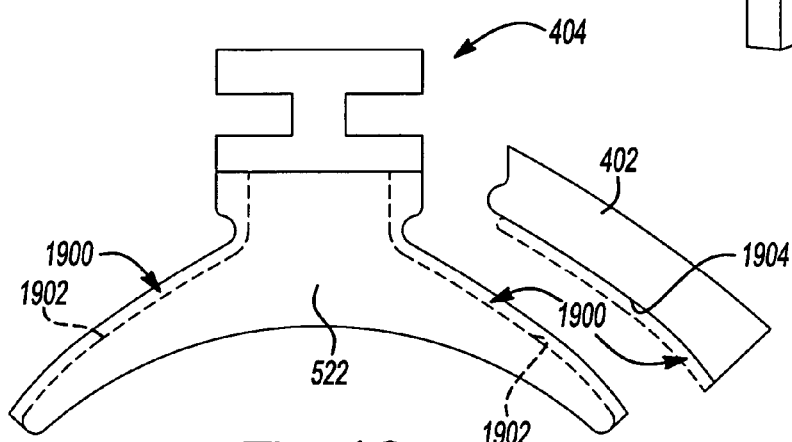
_Fig-19_
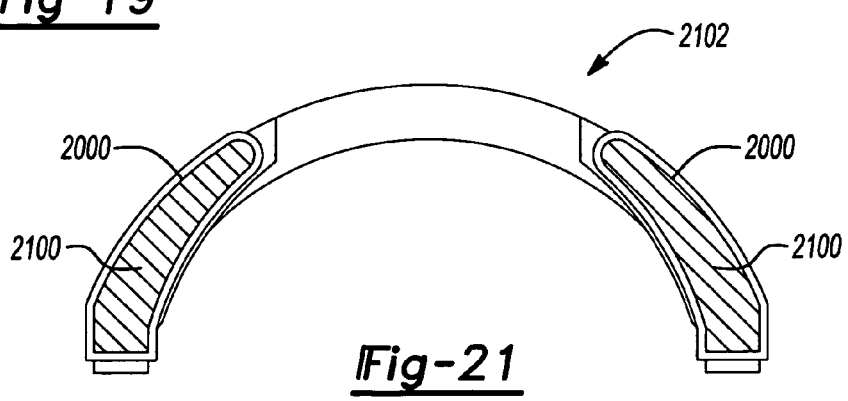
_Fig-21_

ELECTRIC MOTOR HAVING A FIELD ASSEMBLY WITH SLOT INSULATION

CROSS-REFERENCE TO RELATED APPLICATIONS

This application is a divisional of U.S. Ser. No. 10/934,333 filed Sep. 3, 2004. U.S. Ser. No. 10/934,333 claims the benefit of U.S. Provisional Application No. 60/500,384, filed on Sep. 5, 2003, and 60/546,243 filed on Feb. 20, 2004. The disclosures of the above applications are incorporated herein by reference.

FIELD OF THE INVENTION

The present invention relates to dynamoelectric machines, and more particularly, to fields for dynamoelectric machines and methods of making them.

BACKGROUND OF THE INVENTION

Dynamoelectric machines are machines that generate electric power or use electric power. Common types of dynamoelectric machines are alternators, generators, and electric motors.

Electric motors are used in a wide variety of applications involving power tools such as drills, saws, sanding and grinding devices, and yard tools such as edgers and trimmers, just to name a few such tools. These devices all make use of electric motors having an armature and a field, such as a stator.

FIG. 1 shows a typical prior art stator 100 for an electric motor. Stator 100 is formed from a lamination stack 102 around which a plurality of windings of magnet wires 104 are wound to form field coils 114. Lamination stack 102 is formed by stacking together an appropriate number of individual laminations 108 and welding them together. The individual laminations 108 are typically made by stamping them from steel. To do so, loose laminations 108 are loaded in a stacker. The stacker picks up the appropriate number of laminations 108 and places them in a fixture where they are welded together. The laminations 108 are formed with slots so the resulting lamination stack 102 has slots 110 therein in which the magnet wires 104 are wound. Magnet wires, as that term is commonly understood, are wires of the type conventionally used to wind coils in electric machines, such as armatures and stators. Prior to winding the magnet wires 104, insulating sleeves or insulating slot liners (not shown), such as vulcanized fiber, are placed in the slots 110 and end rings 112 placed on the lamination stack 102. End rings 112 are illustratively made of plastic and formed to include coil forms 116. Field coils 114 are then wound by winding the magnet wires 104 in the slots 110. After the field coils 114 are wound, the end of the magnet wires 104 are appropriately terminated, such as to terminals 118 in a terminal post 120. The magnet wires 104 are then bonded together, such as by the application of heat when bondable magnet wires are used. Bondable magnet wires are magnet wires layered with a heat activated thermoplastic or thermoset polymer adhesive. One type of bondable magnet wires commonly used is wire available under the trade name BONDEZE from Phelps Dodge of Fort Wayne, Ind. Alternatively, the magnet wires 104 may be bonded by a trickle resin process described below. Where the stator 100 will be used in an application that exposes it to a particularly abrasive environment, such as a grinder, an epoxy coating is applied to the field coils 114 for abrasion protection.

There are a number of problem areas in the process just described. First of all, it is a capital intensive process. To tool a line to make a stator for a fractional horsepower motor that has a six second cycle time typically requires an investment in the three to five million dollar range. The insulating slot liners must be positioned correctly to meet U.L. (Underwriters Laboratories) requirements and kept positioned properly. In the existing process, the paper slot liners can move when the stator moves to the next station in the process.

The end ring limits slot fill. Slot fill is the amount of magnet wires that can be placed in the slots. The greater the slot fill, the higher the magnetic field generated by the stator. However, increasing the amount of magnet wires placed in the slots can cause the end ring to deform. The end ring can be thickened to reinforce it, but this reduces the slot volume available for the magnet wires.

In the manufacturing process for the stator described above, once the magnet wires have been wound in the slots and the ends of the magnet wires terminated, the magnet wires are bonded if bondable wire is being used and a "trickle" resin is applied over the magnet wires if trickle resin is being used. The process of applying the trickle resin is a somewhat difficult process to manage to obtain consistent results. It also has a number of drawbacks, not the least of which is the cost and difficulty of performing it with reliable, consistent results.

Initially, the trickle process requires the use of a relatively large and expensive oven to carefully preheat the partially assembled stators to relatively precise temperatures before the trickle resin can be applied. The temperature of the trickle resin also needs to be carefully controlled to achieve satisfactory flow of the resin through the slots in the lamination stack. It has proven to be extremely difficult to achieve consistent, complete flow of the trickle resin through the slots in the lamination stack. As such, it is difficult to achieve good flow between the magnet wires with the trickle resin. A cooling period must then be allowed during which air is typically forced over the stators to cool them before the next manufacturing step is taken. Further complicating the manufacturing process is that the trickle resin typically has a short shelf life, and therefore must be used within a relatively short period of time. This requires that batches of the trickle resin be mixed frequently with any that isn't used within its shelf life wasted.

The end result is that stators must often be designed for the process as opposed to optimum performance and cost.

SUMMARY OF THE INVENTION

An electric motor has a field assembly, such as a stator, for a dynamoelectric machine has field coils that are wound to a net shape. Lead wires are brought out from the ends of each field coil. The field coils are insulated with insulating sleeves or insulating slot liners. The field coils are assembled with stator core pieces, such as pole pieces and return path pieces, into the stator. The stator core pieces are formed prior to being assembled with the field coils. In an aspect of the invention, the pole pieces and return path pieces are separately formed and then assembled together with the field coils, which have also been separately formed. In an aspect of the invention, a hand-held power tool has such a motor.

In an aspect of the invention, the field coils are insulated by wrapping a slot liner made of a layer of insulation material around the portions that are disposed between the pole pieces and return path pieces, the layer of insulation material having a B-stage thermoset adhesive or a thermoplastic adhesive on one or both surfaces.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIGS. 4A-4C are perspective views of a stator being assembled in accordance with an aspect of this invention;

FIGS. 5A-5E are side section views of stator return path and pole pieces with mating features in accordance with an aspect of this invention;

FIG. 13 is a perspective view of an insulating slot liner in accordance with an embodiment of the invention;

FIG. 14 is a side view of the insulating slot liner of FIG. 13;

FIG. 15 is a cross-sectional view of a stator in accordance with an embodiment of the invention in which field coils are insulated by the insulating slot liner of FIGS. 13 and 14;

FIG. 18 is a perspective view of a variation of the insulating sleeve of FIG. 9;

FIG. 19 is a side section view of stator core pieces having a coating of insulation;

FIG. 20 is an isometric view of an insulating slot liner made of a layer of insulation material with a B-stage thermoset or a thermoplastic adhesive thereon;

FIG. 21 is a side view of a field coil insulated with the insulating slot liner of FIG. 20

DETAILED DESCRIPTION OF THE PREFERRED EMBODIMENTS

The following description of the preferred embodiment(s) is merely exemplary in nature and is in no way intended to limit the invention, its application, or uses.

Figure 1:
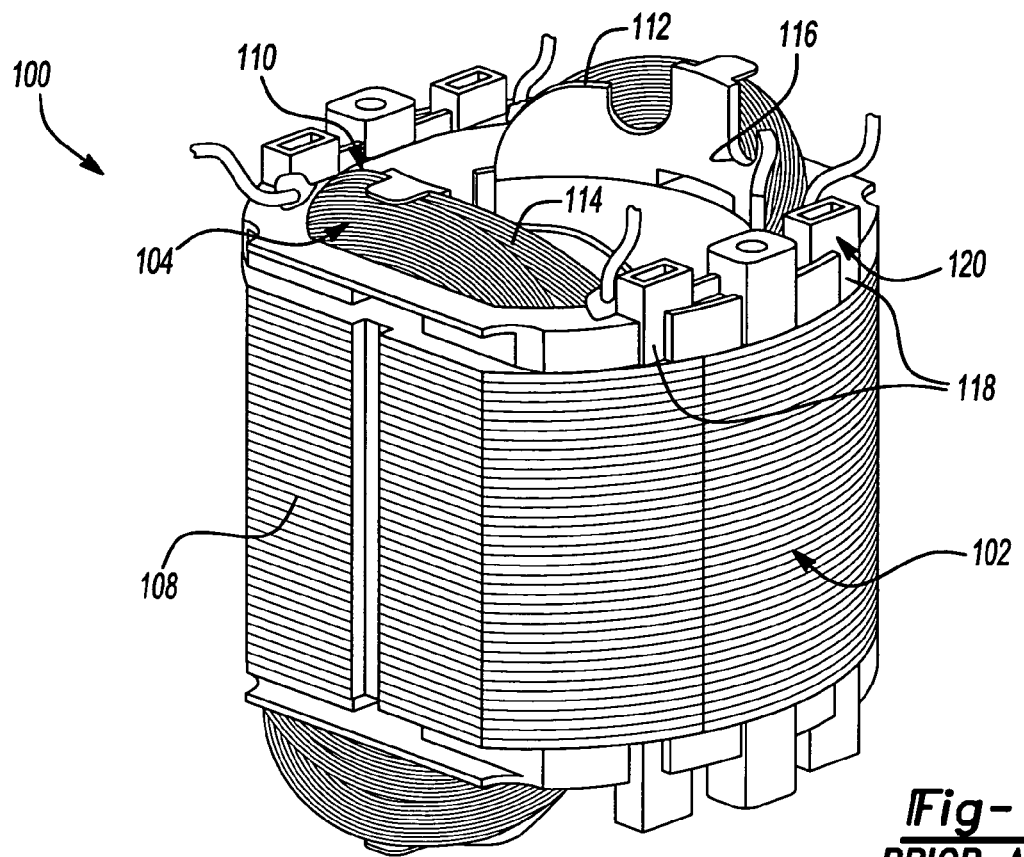
FIG. 1 is a perspective view of a prior art stator.
Figure 2:
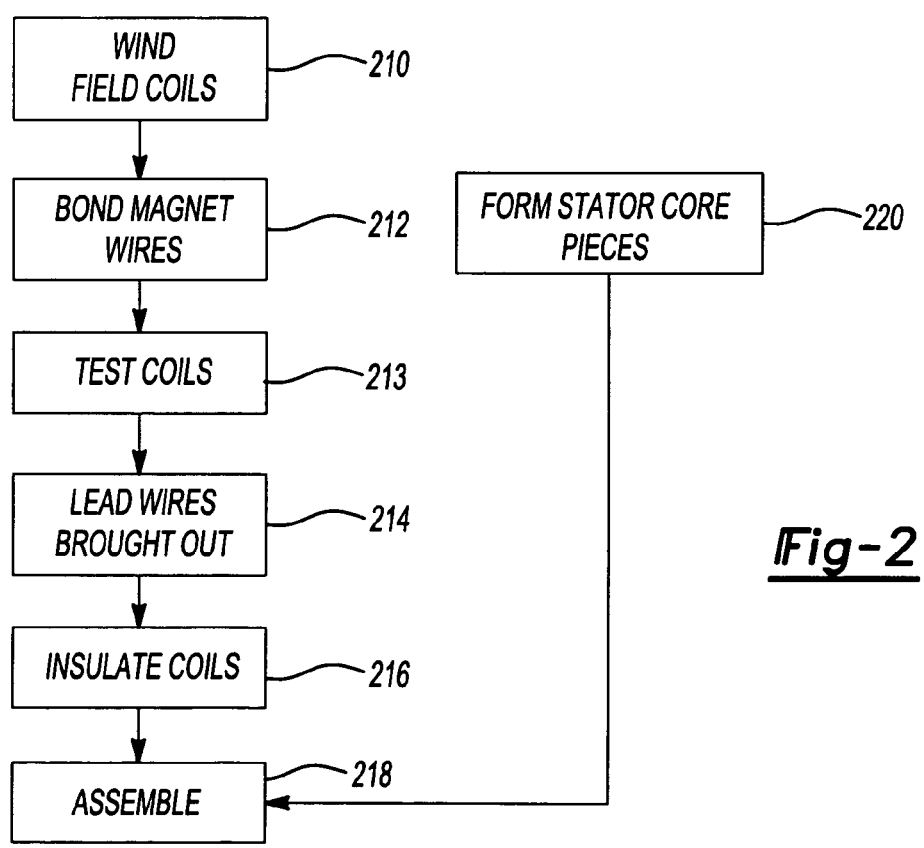
FIG. 2 is a flow chart of a method for forming a stator in accordance with an aspect of the invention.
Figure 3:
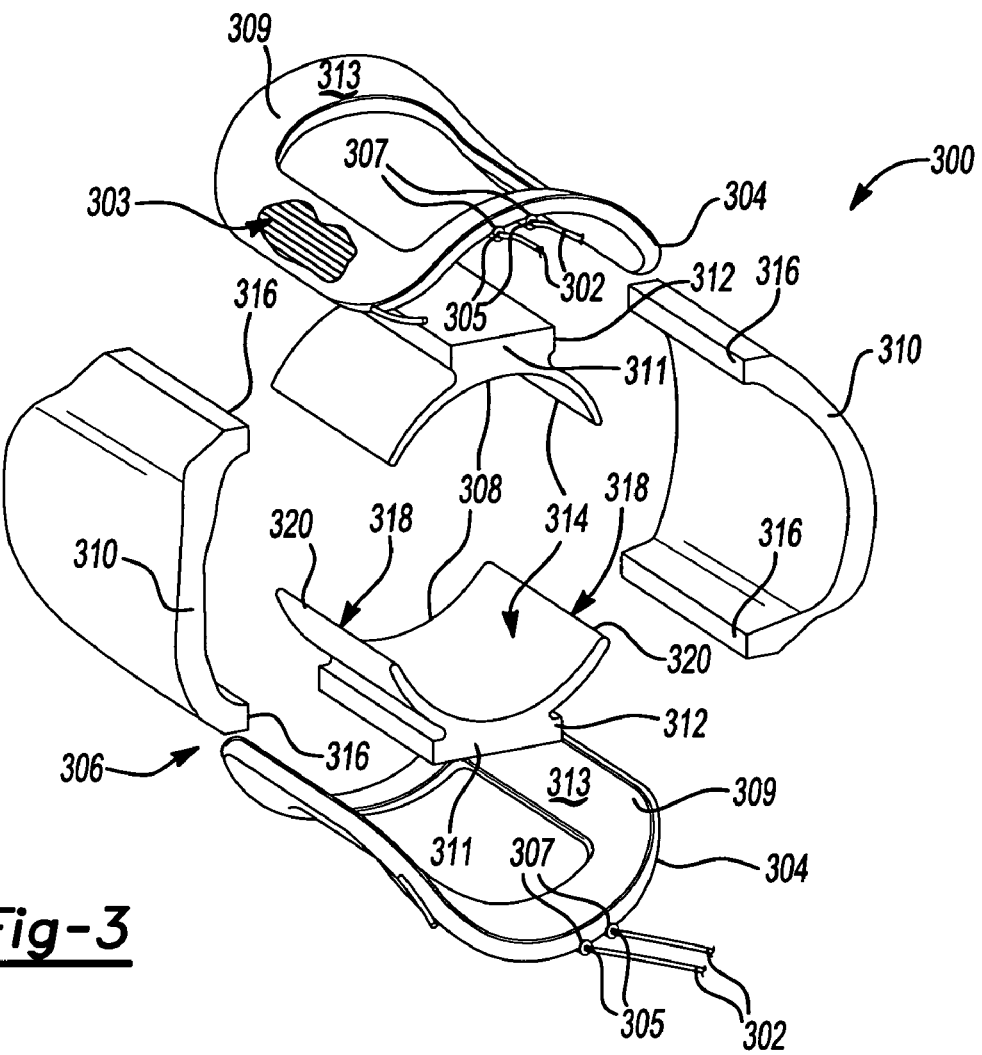
FIG. 3 is an exploded assembly view of a stator formed in accordance with the method of FIG. 2.

Referring to FIGS. 2 and 3, a process for making a field assembly, stator 300 in this instance, in accordance with an aspect of the invention is shown. At step 210, a coil, such as coil 614 (FIG. 6), for field coils 304 of stator 300 is wound to a predetermined shape, preferably net shape, by winding magnet wires 303 to the predetermined shape. "Net shape" means the final shape of the field coils 304 in an assembled stator 300. At step 212, the magnet wires 303 are bonded together. The magnet wires 303 are preferably bondable magnet wires, such as BONDEZE wires, having a layer of heat activated thermoplastic or thermoset adhesive thereon and heat is applied to the formed coil 614 to activate the adhesive on the magnet wires 303 to bond them together. It should be understood that the magnet wires can be bonded when the coil is still in the winding tooling or after it has been removed from the tooling. An advantage of bonding the wires when the coil is still in the winding tooling is that it assures that the coil maintains its shape when it is removed from the tooling. The coils may also be compressed during bonding. The bonded coil 614 is then tested at 213.

Field coils 304 have coil ends 305 with lead wires 302 extending therefrom which are brought out at step 214 from the formed coil 614. Lead wires 302 can be brought out using different alternatives. Coil ends 305 may illustratively be terminated at terminals 307 and lead wires 302 attached to the terminals 307. Lead wires 302 can be attached directly to coil ends 305. Lengths of coil ends 305 can be insulated by various methods, such as shrink tubing, various wall thickness TFE or PTFE tubing, and the insulated lengths provide the lead wires 302. The use of tubing, such as TFE or PTFE tubing, in addition to insulating the coil ends 305, further provides the advantages of strain relief and added rigidity to lead wires 302. Sliding tubing such as TFE or PTFE tubing over the coil ends 305 shields them and the tubing can be retained by any type of end termination.

At step 216, the formed coil 614 is insulated to form field coil 304. The formed coil 614 can be insulated by encapsulating it with an encapsulation material 309 that forms an encapsulation 313. The encapsulation material 309 is illustratively an elastomeric thermoplastic or thermoset plastic, such as thermoset liquid silicon rubber. Encapsulation material 309 is illustratively injection molded around field coils 304. It should be understood that other processes and materials can be used to encapsulate the formed and bonded coils with encapsulation material 309, such as transfer molding or spraying the encapsulation material 309. The encapsulation material could also be a more rigid thermoset. The encapsulation material may illustratively be thermally conductive and could also be a more rigid type of thermally conductive plastic, such as a Konduit® thermoplastic commercially available from LNP Engineering Plastics of Exton, Pa. The encapsulation material may illustratively be applied using the known vacuum impregnation process. The formed field coil 614 would be placed in a vacuum chamber and the encapsulation material wicks onto the field coil 614.

Encapsulating the field coils 304 with the appropriate encapsulating material enhances abrasion protection and improves tracking resistance. Some types of power tools, such as grinders that are used to grind metal and remove mortar between bricks (called tuck pointing), generate a lot of abrasive particles that are drawn into the motor during operation and thus pass over the stator and rotor coil windings. These particles abrade the insulation of the wire, and also tends to abrade the extra trickle varnishes or slurries that may be used to coat the coil windings. Eventually, the wires electrically short and the motor burns up, resulting in an inoperable power tool. Tracking is a condition where an alternate conductive path is created outside the motor, thus carrying electrical current where it normally doesn't go, such as outside of the motor windings. This path is normally created by metal debris drawing into the motor during operation of the power tool that collects in the tool housing and contacts exposed elements of the electrical system of the power tool, such as brush boxes, exposed motor field windings, and lead wires.

Silicon rubber, such as liquid silicon rubber, is one such encapsulating material that can be used to enhance abrasion protection and improve tracking resistance. Silicon rubber is an elastomeric material and cushions the particles drawn into the motor when the particles impact it. Using a grade of silicon rubber with an appropriate durometer gives a desirable balance of functionality in terms of mechanical strength, abrasion resistance, tear resistance, and manufacturability. Illustratively, the liquid silicon rubber has a durometer in the range of 40 to 70 Shore A, and illustratively greater than about 50, and a high tear strength, that is, a tear strength of 200 pounds per inch or greater. It should be understood that other elastomers having comparable properties can also be used as the encapsulating material. The silicon rubber, or similar elastomers, can be applied by various means in addition to injection molding, such as spray-on, brush-on and compression molding and can be cured by any appropriate method, such as heat cure, room temperature cure, moisture cure and UV light cure.

Figure 3A:
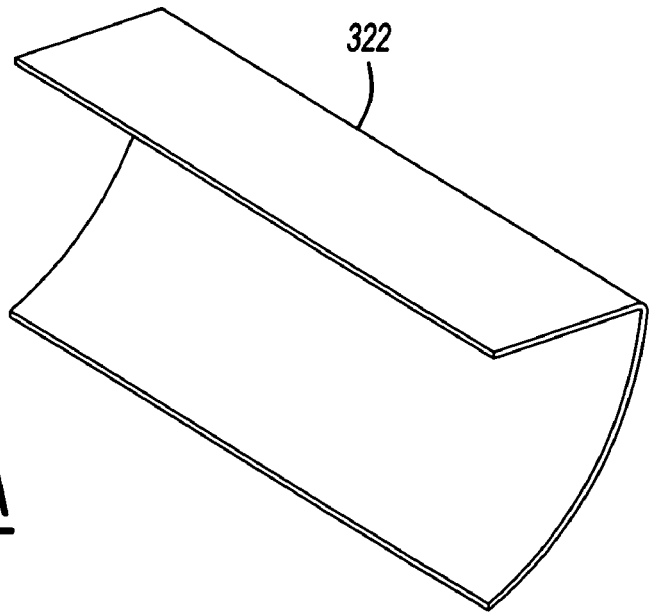
FIG. 3A is a perspective view of a slot liner.

Alternatively or in addition to encapsulating the field coils, insulating slot liners, such as slot liner 322 (FIG. 3A), can be placed in the slots of the stator core between pole pieces 308 and inner surfaces of return path pieces 310. Such a slot 503 is shown more specifically in the embodiment of FIG. 5A between pole pieces 404 and an inner surface 505 of return path pieces 402. The insulating slot liners may illustratively be known types of insulating slot liners, such as those made of vulcanized fiber or rag-polyester.

Insulated field coils 304 are assembled with stator core pieces 306 to form stator 300. Stator core pieces 306 include pole pieces 308 and back iron or return path pieces 310.

Figure 7A:
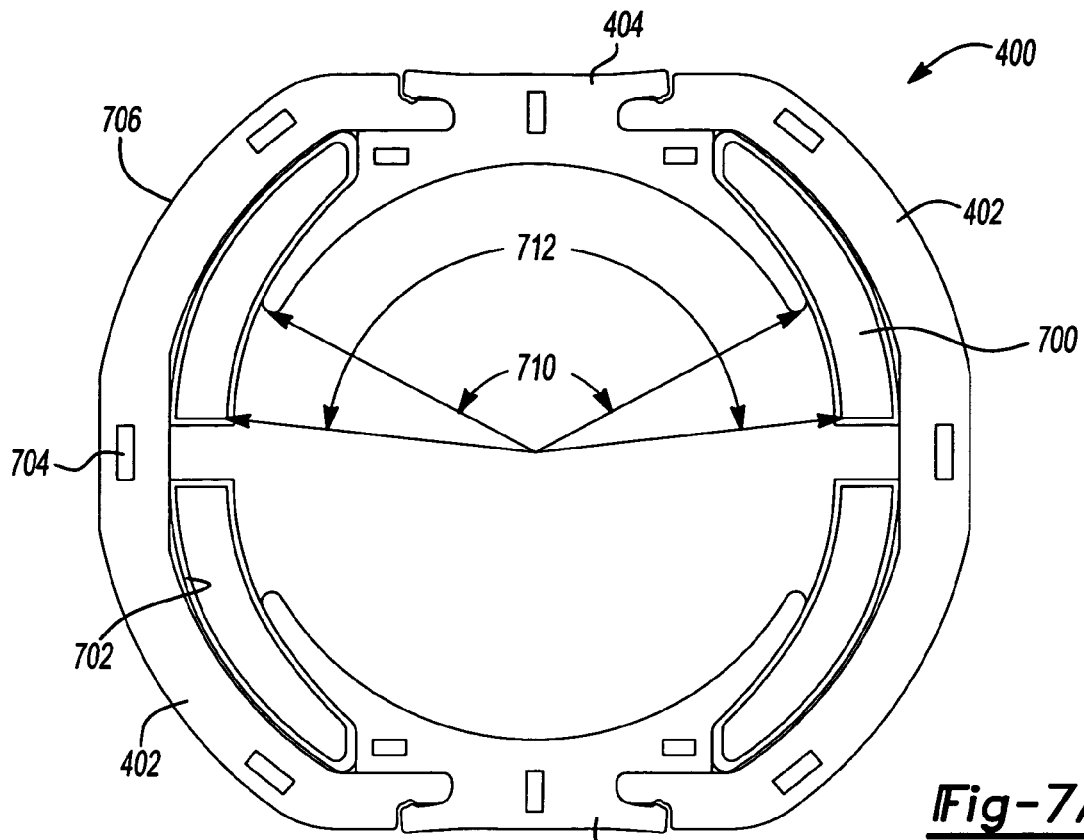
FIGS. 7A and 7B are side section views of a variation of the stator of FIG. 4 in accordance with an aspect of the invention.
Figure 7B:
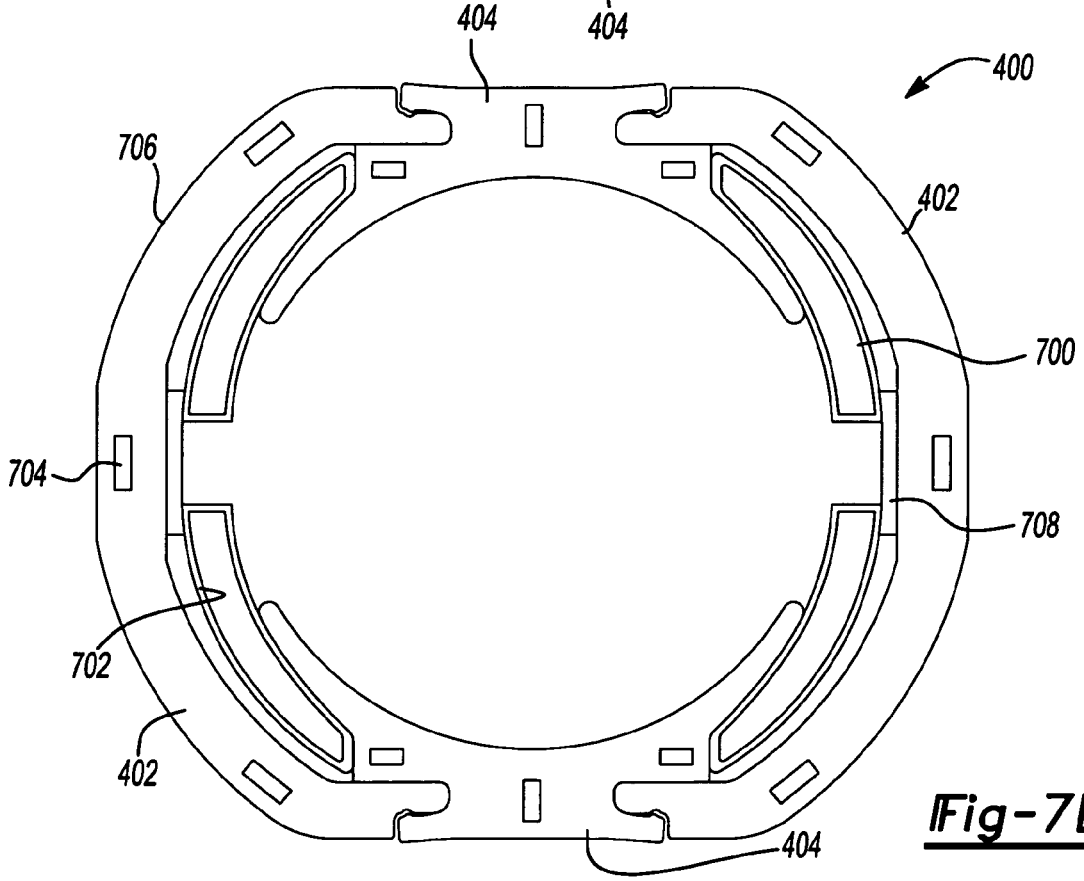

Stator core pieces 306 are formed at step 220 out of steel laminations, as discussed above. In this regard, the laminations can be stacked and bonded together, such as by welding, or the laminations 706 (FIGS. 7A and 7B) stamped with interlocks, such as interlocks 704 (FIGS. 7A and 7B), which interlock the laminations together as the laminations are stamped. Each core piece 306 may illustratively be seam welded separately across its laminations to strengthen it during handling, assembly of stator 300 and during operation of the motor in which stator 300 is used. Stator core pieces 306 can also be made by molding or pressing them out of an iron powder, illustratively, insulated iron powder, such as a sulfate coated iron powder. One such sulfate coated iron powder is SOMALOY™ 500 available from Höganäs AB of Sweden through its U.S. subsidiary, North American Höganäs, Inc., 111 Hoganas Way, Hollsopple, Pa. 15935-6416. It should be understood that stator core pieces 306 could also be formed from other iron powders that can be pressed or molded, such as sintered iron powder.

It should be understood that forming the stator core pieces 306 is illustratively carried out independently of forming field coils 304 and vice versa. Consequently, stator core pieces 306 and field coils 304 can be made on separate lines and stockpiled until needed. It also allows the geometry of field coils 304 and stator core pieces 306 to be optimized. Moreover, pole pieces 308 are illustratively made separately from return path pieces 310. This allows the geometry of the pole pieces 308 and the return path pieces 310 to be separately optimized. Preferably, the pole pieces 308 are identical as are the return path pieces 310 and the field coils 304.

Each pole piece 308 illustratively has a neck 311 with a rectangular outer base 312 with an inwardly opening arcuate cylindrical pole tip section 314 thereon having pole tips 318. Each return path piece 310 is illustratively semi-cylindrical with opposed ends 316 shaped to attach to one or both of the opposed ends 316 of the other return path piece 310 and the rectangular outer bases 312 of pole pieces 308. In assembling encapsulated field coils 304 and stator core pieces 306, encapsulated field coils 304 are placed over the necks 311 of respective pole pieces 308. Return path pieces 310 are then secured to pole pieces 308, such as by snapping together, welding, riveting, with screws, forming operations, or the like.

Figure 3B:
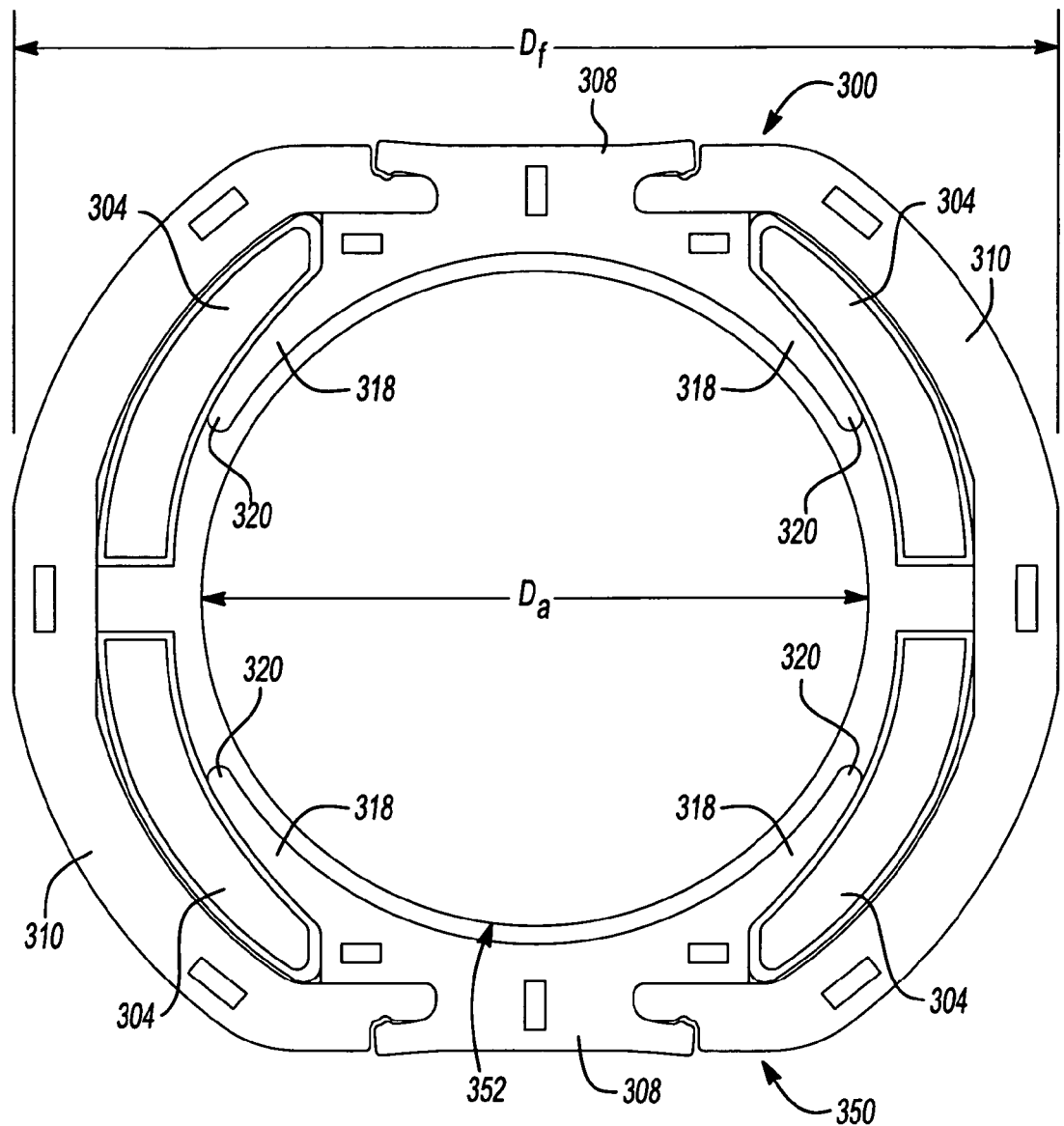
FIG. 3B is a top view of an electric motor made using the stator of FIG. 3.

An armature, such as armature 352 (FIG. 3B) is then placed in stator 300 in making an electric motor, such as electric motor 350 (FIG. 3B).

The process just described provides a number of advantages. A relatively simple, inexpensive machine can be used to wind the field coils 304. Moreover, multiple magnet wires can be wound at the same time to form the field coils 304. It also provides for a higher slot fill factor (total area of wire in the winding slot, including wire insulation, divided by available or total area of the winding slot), particularly when the wires of the coils are compressed during bonding. Looked at a different way, it provides for denser field coil that has a higher packing factor (total area of the wire, including wire insulation, divided by the area of the envelope of the field coil defined by the inner and outer perimeters of the field coil).

Compressing the wires during bonding improves bonding by assuring that adjacent wires of the coil are firmly together resulting in increased bond strength. Also, by pressing the wires of the coil together, many of the voids from the winding process are eliminated. This reduces or eliminates air pockets in the coil resulting in improved heat transfer because the inner wires of the coil are in direct contact with the outer wires, which are exposed to airflow when the motor is in operation. The resistive heat generated during operation of the motor can thus be dissipated through the coil quicker by being conducted through adjacent wires rather than convection through an air pocket. Finally, by compressing the wires of the coil together, a higher slot fill factor and packing factor can be achieved compared to conventional winding techniques. This allows for more turns of wire or equal turns of larger gauge (thicker) wire than provided by conventional winding techniques. Field coils having packing factors of greater than sixty, seventy, eighty and up to about eighty five percent can be achieved with this process.

In an aspect of the invention, multi-stranded wire is used to wind the field coils 304 which also provides for more slot fill. A commercially available wire of this type is commonly known as litz wire.

In an aspect of the invention, multiple magnet wires having different functions and, illustratively, different sizes, can be wound to form the field coils 304. For example, eighteen gauge magnet wire can be wound in each field coil 304 to form one or more coils that are energized to provide the magnetic field that interacts with the armature of the electric motor to rotate the armature. Twenty-one gauge wire can be wound in each of field coils 304 to form coils that are energized to brake the armature. In this regard, the magnet wires of different sizes are wound sequentially, that is, first one size of magnet wire is wound and then the second size of magnet wire is wound, or they are wound at the same time. The twenty-one gauge wire is illustratively wound with more turns than the eighteen gauge wire to produce the needed amount of flux to brake the armature quickly.

Forming the field coils 304 into predetermined shape(s), such as by winding them to pre-determined shape(s), and then bonding the magnet wires 303 allows the field coils 304 to be wound so that they extend beyond edges 320 of pole tips 318 of pole pieces 308 when field coils 304 are assembled in stator 300. That is, the field coils 304 can extend beyond the edges 320 of pole tips 318 of pole pieces 308. In this regard, the return path pieces 310 may be formed so that they are axially longer than the pole pieces 308. This also allows the magnet wire to be wound so that the field coils 304 extend around or beyond ends of the pole pieces 308 and not extend beyond the edges of the return path pieces 310 once they are assembled in stator 300. Also, the coil forming step allows the field coils 304 to be formed more compactly, as discussed, and thinner. By being able to form the field coils 304 so that they extend beyond edges 320 of pole tips 318 of pole pieces 308 and be more compact, applicants have determined that at least ten percent more output power can be achieved as well as providing better thermal characteristics for a given size field. For example, applicants found that an electric motor having a 59 mm diameter stator made in accordance with the invention has about thirty-six more percent output power than an electric motor having a 59 mm diameter conventionally made stator. This also permits a smaller diameter stator to be used for a given amount of output power. For example, applicants found that an electric motor having a 55 mm diameter stator formed according to the invention has about the same output power as an electric motor having a 59 mm diameter conventionally formed stator.

Forming the field coils 304, illustratively into net shapes, and then assembling the field coils to the pole pieces also allows the overall diameter of stator 300 for a given diameter motor to be kept the same but allows a larger diameter armature to be used. As is known, the maximum motor performance measured by cold or hot max watts out increases as the size of the armature increases. More specifically, as the diameter of a motor armature increases, the power of a motor goes up by the square of the armature diameter. But with conventional motors, every incremental increase in the diameter of the armature results in a corresponding increase in the diameter of the stator and thus of the motor. A motor using a stator made in accordance with the invention discussed above and as further discussed below allows the windings of the field coils, such as field coils 304, to be packed more tightly. It also allows them to be packed more thinly which in turn allows the thickness of the stator core pieces to be reduced. Packing the windings of the field coils 304 thinner allows, as discussed above, the diameter of the motor to be reduced or a larger diameter armature used for a given diameter motor. The above motor having a 55 mm diameter stator constructed in accordance with this invention (which is also the diameter of the motor) for use in a small angle grinder provides a power output of about 1000 W. To achieve a power output of 1000 W using a conventional stator requires a 59 mm stator.

Using the above referenced motor with the conventional 59 mm diameter stator as an example, which has field coils wound about the pole tips of the poles by a needle-winder as is conventional, this motor has a total slot area for the field coils (slot area being the area in which the field coils can be disposed which in the case of the conventional needle wound field is limited by the width or arc of the pole tips of the poles) of about 90 mm$^2$ and radial dimensions as follows:

| | |
|---|---|
| Armature radius: | 17.5 mm |
| Airgap | 0.5 mm |
| Field coil thickness: | 6.5 mm (includes thickness of pole tip) |
| Back iron thickness: | 5 mm |

(The air gap is the gap between the field coils or faces of the pole tips, whichever is closer to the armature, and the armature.)

The above referenced motor with the 55 mm diameter stator made in accordance with this invention where the field coils 304 can extend beyond the edges 320 of the pole tips 318 has a total slot area for the field coils of about 100 mm$^2$ with the following radial dimensions:

| | |
|---|---|
| Armature radius | 17.5 mm |
| Airgap | 0.5 mm |
| Coil thickness | 4.5 mm (includes thickness of pole tip) |
| Back iron thickness | 4 mm |

The armature winding in both cases is eight turns of 0.52 mm wire and winding of each field coil in both cases is sixty-two turns of 0.75 mm wire.

Alternatively, a 59 mm diameter stator constructed according to this invention could be used allowing for the diameter of the armature to be increased 4 mm, with a commensurate increase in power.

Table 1 below shows the armature OD, Field OD, Armature OD/Field OD ratio, and power output at 38,000 RPM for conventional AC motors having a Field OD of 57 mm and 59 mm and Table 2 below shows the same information for AC motors with fields made in accordance with the foregoing aspect of the invention having a field O.D. of 55 mm and 59 mm.

TABLE 1

| Field O.D. | Armature O.D. | Ratio | RPM | Watts |
|---|---|---|---|---|
| 56.96 mm | 35.19 mm | 0.618 | 38000 | 800 |
| 59.00 | 35.19 mm | 0.596 | 38000 | 1000 |

TABLE 2

| Field O.D. ($D_f$) | Armature O.D. ($D_a$) | Ratio | RPM | Watts |
|---|---|---|---|---|
| 55.00 mm | 35.19 mm | 0.640 | 38000 | 1050 |
| 59.00 | 37.00 mm | 0.627 | 38000 | 1600 |

Referring to the AC motor having a 59 mm field O.D. as an example, as can be seen from Tables 1 and 2, the motor made in accordance with the foregoing aspect of the invention allows use of a 37 mm O.D. armature with a commensurate increase in power to 1600 Watts at 38,000 RPM compared to a conventional AC motor which utilizes a 35.19 mm O.D. armature and has a power output of 1000 Watts at 38,000 RPM. Also as can be seen from Tables 1 and 2, a motor having a 55 mm O.D. field made in accordance with this aspect of the invention allows use of a 35.19 mm O.D. armature resulting in a power output of 1050 Watts at 38,000 RPM, which is more than 1.25 times the power of an existing AC motor having a 56.96 mm O.D. field which also uses a 35.19 mm O.D. armature. In accordance with the foregoing aspect of the invention, for a given motor volume (motor outside diameter×motor length) an AC electric motor 350 (FIG. 3B) made in accordance with the foregoing aspect of the invention has an armature 352 and a field or stator 300 with an armature O.D. ($D_a$) to field O.D. ($D_f$) ratio of at least 0.625 which results in motor 350 having at least 1.3 times the power of an existing AC electric motor with a field having the same O.D. but with the smaller O.D. armature. The motor is also thermally balanced with the operating temperature of the field being about the same as the operating temperature of the armature at the current or power rating of the motor, such as the Underwriter Laboratories' rating of the motor.

Forming the stator core pieces 306 separately from each other and particularly from the field coils 304 decouples an important aspect of the design and configuration of the field coils from the design and configuration of the stator core pieces 306, the pole pieces 308 in particular. In conventional stators with needle-wound field coils, the field coils can't extend beyond the edges of the pole tips since the pole tips are used to hold the wires of the field coils during winding and before bonding or application of the trickle resin. The usable field winding area is thus defined by the width or arc (included angle) of the pole tips. While the arc of the pole tips can be increased to increase the area in which the field coils can be wound, this causes performance problems, particularly, commutation performance. Extending the arc of the pole tips too much degrades commutation. Thus, commutation performance limits the degree to which the area in which the coils are wound can be increased by increasing the arc of the pole tips. In contrast, in a stator made in accordance with the invention as described above and below, such as stator 300, the arc of the pole tips does not limit the area in which the field coils can be disposed, and thus does not limit the size of the field coils 304. As discussed, the field coils 304 can be formed so that they extend beyond the edges 320 of the pole tips 318. That is, the arc or included angle of the field coil is greater than the arc or included angle of the pole tips. Thus, in a two pole stator such as stator 300, the two field coils 304 can be formed so that their respective edges are almost adjacent each other, that is, each field coil 304 has an arc (included angle) of almost one-hundred and eighty degrees, as shown representatively by field coils 614 in FIG. 15. Comparing the above discussed 55 mm motor having a stator made in accordance with this invention to the above discussed 59 mm motor having a conventional needle-wound stator, the pole tips of the 55 mm motor have an arc or included angle 710 (FIG. 7A) of 110 degrees and the field coils have an arc or included angle 712 of 158 degrees, whereas the field coils of the conventional 59 mm motor have an arc or included angle of 125 degrees which is the arc or included angle of the pole tips. Stators made in accordance with this invention can have field coils that have arcs or included angles of that are more than 100% of the arcs or included angles of the pole tips and up to about 163% of the arcs or included angles of the pole tips, such as, by way of example and not of limitation, at least 110%, 125%, 140%, 155% of the arcs or included angles of the pole tips.

Forming the field coils 304 before assembling them in stator 300 also provides the advantage of simplifying "leading" them. "Leading" the field coils 304 is the process of bringing out or attaching lead wires, such as lead wires 302. In conventional stators where the field coils are needle-wound around the poles, a length of the magnet wire must be brought out from the wound coil and either attached to a terminal placed in the end ring or if used as the lead wire, terminals attached. If the magnet wire is used as the lead wire, it must be strain relieved. This process typically results in a length of wire (magnet wire, lead wire, or both) that is longer than needed for the actual lead wire which must then be routed through the stator to secure it and keep it from touching the armature when the motor in which the stator is assembled in use. In contrast, by forming field coils 304 separately from the stator core pieces 306 and before they are assembled in stator 300, the "leading" process is simplified as it is much easier to get access to the coil since it is not in the stator. The lead wire can be attached directly adjacent the coil with little magnet wire needed to be brought out from the coil. If the magnet wire is used as the lead wire, only the length needed for the lead wire need be brought out. A further advantage is that if an unrepairable mistake is made in "leading" the field coil 304, only that field coil 304 need be scrapped and it can be scrapped without any disassembly. In contrast, if a mistake is made in leading a field coil in a conventional stator, either the entire stator has to be scrapped or the field coils disassembled from the stator and new field coils wound, which is usually impractical if not impossible.

Pressing the stator core pieces 306 out of iron powder provides additional advantages to those described above. The stator core pieces 306, the pole pieces 308 in particular, can be formed in one operation as a three-dimensional part. In contrast, in the conventional process described above, the pole pieces of the stator are made by stacking an appropriate number of laminations, in effect, stacking the appropriate number of two-dimensional pieces to arrive at the resulting three-dimensional pole piece. By pressing the stator core pieces 306 from iron powder, tighter tolerances can be maintained than with the conventional process.

Using insulated iron powder as the iron powder provides additional advantages in that insulated iron powder has low eddy current losses.

FIGS. 4A-4C show a variation of the above described aspect of the invention. A field assembly, stator 400 in this instance, has first and second return path pieces 402, first and second pole pieces 404, and first and second field coils 406. Field coils 406 are illustratively pre-formed coils encapsulated with an elastomeric encapsulation 408. Field coils 406 are illustratively wound to the predetermined shape as described above with reference to the embodiment shown in FIG. 3. Illustratively, elastomeric encapsulation 408 is liquid silicon rubber, as described above. It should be understood that field coils 406 can be insulated in other manners as described above.

Figure 5D:
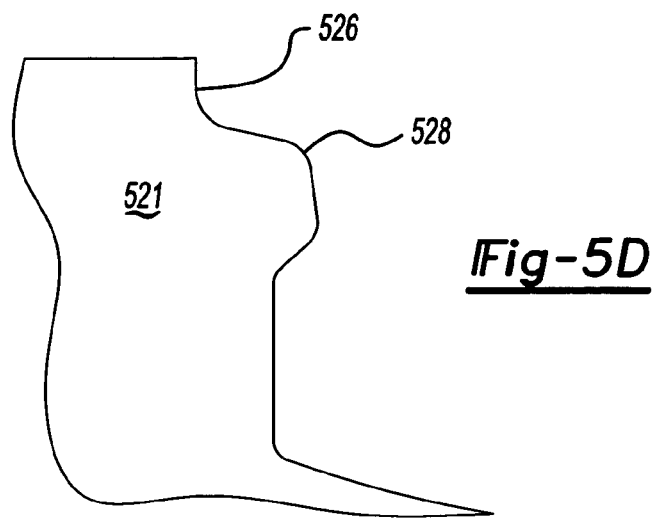

To assemble stator 400, field coils 406 are placed over necks 414 of pole pieces 404. Necks 414 have opposed receiving pockets 504 (FIGS. 5A-5C) therein between pole tip section 522 of pole pieces 404 and base portion 524 of necks 414 of pole pieces 404. Circumferentially and radially outer edges 526 of pole tip section 522 project circumferentially outwardly to provide lips 528 (in other words, pole tip portions 522 have undercuts 527). Edges 526 may illustratively be recessed and have a radius as shown in FIG. 5D to ease the assembly of field coils 406 to pole pieces 404. If edges 526 are sharp edges, the insulation on field coils 406 could catch and possibly be displaced from its correct position on the coil. With edges 526 having a smooth radius, the insulation on field coils 406 more freely slides onto pole pieces 404 and facilitates keeping the insulation correctly positioned on field coils 406.

Field coils 406, when encapsulated with an elastomeric encapsulation material such as liquid silicon rubber, snap over lips 528 and into undercuts 527 which retains them in place during further assembly of stator 400. Bumps or other interference features may illustratively be formed of the encapsulation material where the field coils abut the pole tip portions 522 to further retain the field coils 406 to the pole pieces. In a variation, lips 528 may also be staked over field coils 406 in one or more places, shown illustratively at 529, to provide further retention of field coils 406 as shown in FIG. 5F.

Ends 418 of field coils 406 may extend beyond pole tips 420 of pole pieces 404. Return path pieces 402 are then brought in radially (laterally) and mated to the pole pieces 404. Opposed edges 423 of radial outer ends 422 of pole pieces 404 have mating features 424 that mate with corresponding mating features 426 in edges 428 of return path pieces 402, as described in more detail below.

In an aspect of the invention, field coils 406 may have mating features 410 formed in encapsulation 408. Pole pieces 404 have corresponding mating features 412 formed therein, and in this regard, pole pieces 404 may be encapsulated with an encapsulation material with the mating features 412 formed in this encapsulation, or the mating features 412 formed directly in the soft magnetic material of which pole pieces 404 are made. Mating features 410 may illustratively be a projection or detent and mating feature 412 would then be a corresponding hole or recess. The converse could also be used—that is, mating feature 412 is the projection or detent and mating feature 410 is the corresponding hole or recess. Mating features 410 of field coils 406 and mating features 412 of pole pieces 404 mate together when field coils 406 are placed over the necks 414 of pole pieces 404, holding each field coil 406 to a respective pole piece 404, making coil/pole subassemblies 416. Pole pieces 404 may illustratively be made of laminations or of iron powder, such as insulated iron powder, such as described above with reference to FIGS. 2 and 3. Similarly, return path pieces 402 can be made of laminations or insulated iron powder.

Turning to FIGS. 5A and 5B, an embodiment of mating features 424, 426 is shown. Mating feature 426 of each edge 428 of each return path piece 402 is a projection 500 that extends from the respective edge 428 of the return path piece 402, with a recess 502 at a junction of projection 500 and edge 428 of return path piece 402. Mating feature 424 in each opposed edge 423 of each radial outer end 422 of each pole piece 404 (FIG. 4B) comprises receiving pocket 504 defined between outer finger 506 of base portion 524 of pole piece 404 and pole tip portion 522 of pole piece 404. Mating feature 424 further includes outer finger 506 having a projection 510 extending radially inwardly from an outer end 512 of finger 506.

Each receiving pocket 504 is illustratively larger than the projection 500 of the respective return path piece 402 so that projection 500 is easily received in the receiving pocket 504. This is accomplished by forming finger 506 so that it is at an angle 514 with respect to projection 500, as shown in FIG. 5B, when projection 500 is first inserted into receiving pocket 504. Additionally, mating radii of receiving projection 500 and receiving pocket 504 are sized so that there is always an appropriate clearance 516 between them taking tolerances into account.

Once the projections 500 of return path pieces 402 are inserted into receiving pockets 504 of respective pole pieces 404, the fingers 506 of pole pieces 404 are deformed radially inwardly so that projections 510 extending radially inwardly from outer ends 512 of fingers 506 are received in recesses 502 of respective return path pieces 402. The mating of projections 510 in recesses 502 forms mating detents 518 (FIG. 5A) that mechanically lock pole pieces 404 and return path pieces 402 together. Return path pieces 402 and pole pieces 404 are thus mechanically interlocked by mating detents 518 and held together by friction. Pole pieces 404 can also be welded to return path pieces 402 to further strengthen the attachment of pole pieces 404 to return path pieces 402. Alternatively, pole pieces 404 and return path pieces 402 could just be welded together.

FIG. 5C shows a variation of the mating features 424, 426 of FIGS. 5A and 5B which is almost identical to the embodiment shown in FIGS. 5A and 5B, and only the differences will be discussed. Elements of FIG. 5C common with the elements of FIGS. 5A and 5B are identified with the same reference numbers. The difference is that the mating detent 518 is moved distally outwardly along projection 500. This increases the "critical length" designated by reference numeral 520 compared with the length of the same segment in the embodiment shown in FIGS. 5A and 5B. This critical length is the length of the segment of return path piece 402 and pole piece 404 through which the majority of the magnetic flux is carried. Maximizing this critical length benefits motor performance.

Illustratively, when return path pieces 402 are mated with pole pieces 404, they are brought together radially shown by arrow 440 in FIG. 4B, as opposed to axially. The return path piece 402 radially compresses respective sides of the field coils 406 mounted on pole pieces 404. This eliminates the return path piece 402 sliding axially across the field coils 406 and the possible damage to the insulation surrounding the field coils 406 due to the return path piece 402 sliding across them. Also, the tolerances, particularly of the field coils 406, can be somewhat looser when the return path pieces 402 and pole pieces 404 are mated by bringing them together radially as opposed to axially.

Making the return path pieces 402 separately from the pole pieces 404 also provides the advantage that not only can different materials, such as different magnetic grades of steel, be used to make them, but different construction techniques can be used. For example, the pole pieces 404 could be made of stacks of laminations as described above and the return path pieces made of solid steel. The pole pieces 404 would then include deformable portions that would be deformed against corresponding portions of return path pieces 402 to fasten the return path pieces 402 and pole pieces 404 together.

While stators 300 and 400 (FIGS. 3 and 4) have been described in the context of having two poles with two return path pieces and two pole pieces, it should be understood that other configurations can be used that are within the scope of the invention. For example, only one return path piece could be used, which would illustratively be a cylindrical piece, with the two pole pieces being affixed to an inner side of the return path piece on opposite sides thereof. Each return path piece could be made of multiple pieces that are joined together, such as by welding or by forming mating features therein that snap together. The stator core pieces could also be held together by being inserted in a stator housing. The stators could also have more than two poles, such as four, six, eight or other multiples of two. In this regard, at least one pole piece would be provided for each pole and they would be spaced equidistantly around the stator. Each pole piece could be made of multiple pieces that are joined together.

Figure 17:
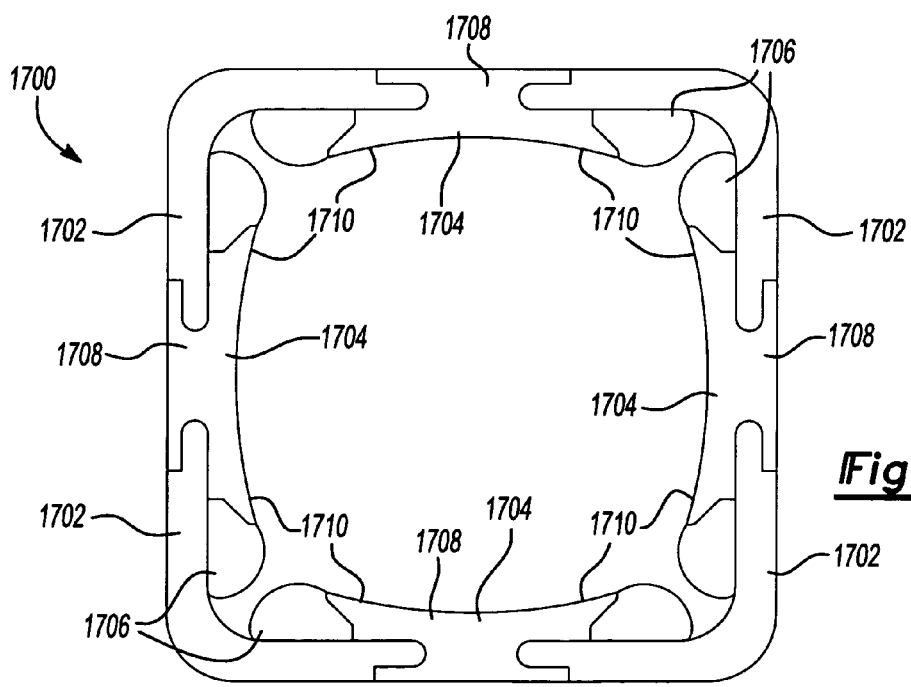
FIG. 17 is four pole stator formed in accordance with an embodiment of the invention.

FIG. 17 shows such a stator 1700 having more than two poles, illustratively, four poles. Stator 1700 illustratively includes four return path pieces 1702, four pole pieces 1704 and four field coils 1706. Return path pieces 1702, pole pieces 1704 and field coils 1706 are all separately formed in the manner described above. Field coils 1706 are then placed over necks 1708 of pole pieces 1704 so that they abut pole tips 1710 of pole pieces 1704 and pole pieces 1704 and return path pieces 1702 mated together.

In an aspect of the invention, the core pieces of the stator include at least three pieces—two pole pieces and one return path piece. In an aspect of the invention, the pole pieces, return path piece or pieces and the field coils are all separately formed and then assembled together. By separately formed, it is meant that the pole pieces are formed separately from the return path piece or pieces which are in turn formed separately from the field coils.

FIG. 6 shows an illustrative embodiment of a mold 600 that can be used to mold the encapsulation material, such as encapsulation material 309 (FIG. 3) that forms the encapsulation, particularly when an elastomeric encapsulation material such as liquid silicon rubber is used. Mold 600 has a core plate 602 having a plateau 604 from which locating posts 606 extend. On either side of plateau 604, core plate 602 has raised pads 608 and holes 610. Raised pads 608 are illustratively oval shaped and extend the majority of the way between plateau 604 and edges 612 of core plate 602. Mold 600 also has a cavity plate, not shown, that mates with core plate 602 when mold 600 is closed. The cavity plate may also have raised pads 608 and holes 610.

Raised pads 608 maintain coil 614 in centered spaced relation to a surface 620 of core plate 602 facilitating the flow of the encapsulating material 309 around the radial inner side 622 of coil 614. Holes 610 result in compression tabs or projections 624 being formed in encapsulation 313 on the radial inner side 622 of field coil 304 and, if provided in the cavity plate of mold 600, on the radial outer side 628 of field coil 304. (For continuity, reference number 622 is used to identify the radial inner side of coil 614 and of field coil 304). Raised pads 608 form recesses 626 in the encapsulation 313 on radial inner side 622 of field coil 304 and, if provided in the cavity plate of mold 600, on the radial outer side 628 of field coil 304. In addition to providing spacing between coil 614 and core plate 602, and the cavity plate of the mold 600 if provided on the cavity plate, raised pads 608 can also be used to thin out the walls of the encapsulation 313 that encapsulates coil 614 of field coil 304. Compression tabs 624 provided added areas of compression between field coil 304 and the pole pieces 308 (compression tabs 624 on the radial inner side 622 of field coil 304) and between the field coil 304 and the return path pieces 310 (compression tabs 624 on the radial outer side 628 of field coil 304) when field coil 304 is assembled into stator 300 (FIG. 3). Compression tabs 624 are dimensioned so that they are small compared to the overall area of field coil 304 so that they provided added retention without significantly increasing the assembly interference forces when field coil 304 is assembled with stator core pieces 306 (FIG. 3) to form stator 300 (FIG. 3).

Figure 6A:
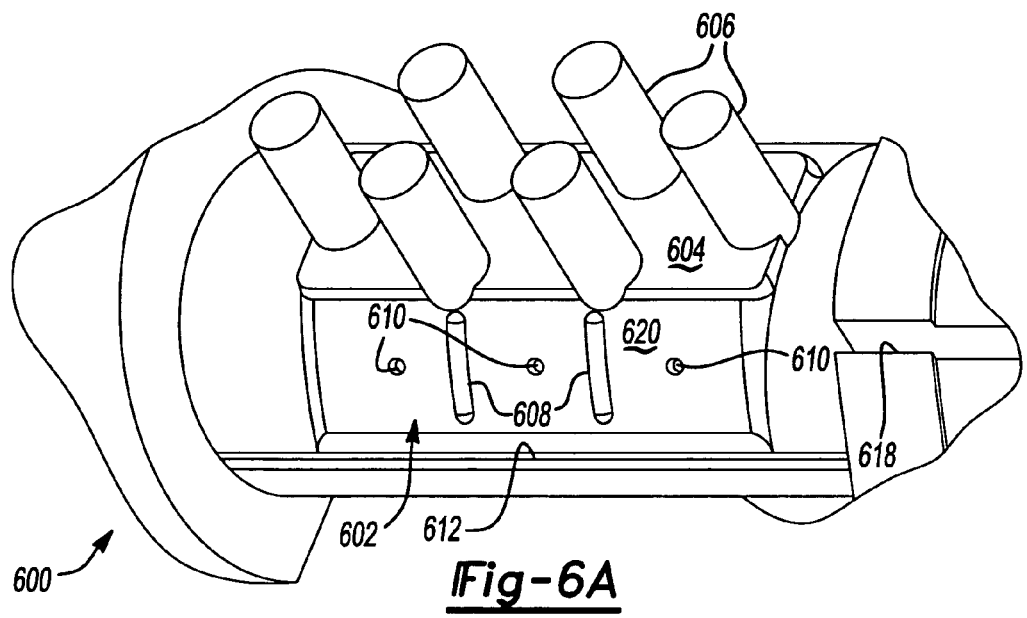
FIGS. 6A-6C are perspective views of a mold used to encapsulate a field coil in accordance with an aspect of the invention, a coil prior to molding and a field coil after molding.
Figure 6B:
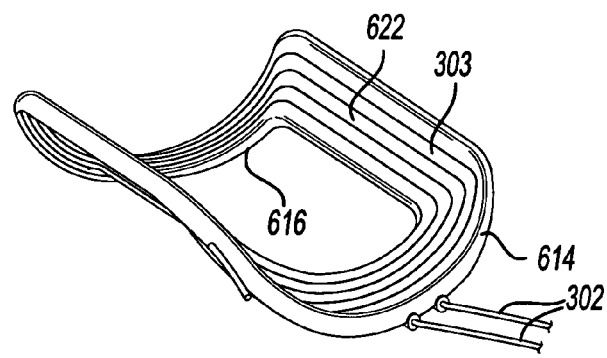
Figure 6C:
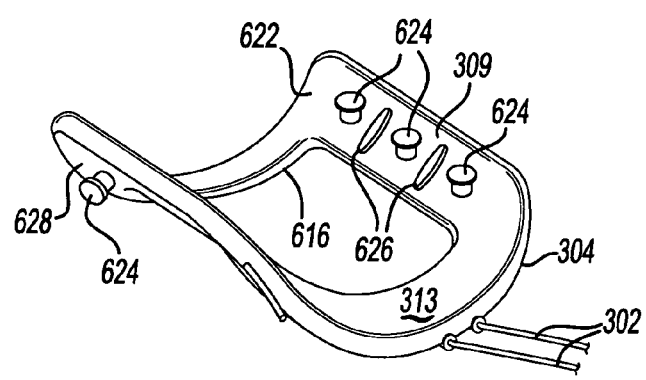

With reference to FIGS. 6A-C, the molding of a field coil, such as field coil 304 (FIGS. 3 and 6C), is described. The magnet wires 303 are wound in a coil 614 (FIG. 6B) having a predetermined shape, which is illustratively a section of a cylinder with a central open rectangular section 616 (FIG. 6B), which is also the final shape of the field coil 304 as can be seen from FIG. 6C. Coil 614 is placed in mold 600 so that plateau 604 extends through central open rectangular section 616. Central open rectangular 616 of coil 614 is placed around locating posts 606 when coil 614 is first placed in mold 600 which assist in properly locating coil 614 on core plate 602 as coil 614 is being placed in mold 600. Lead wires 302 are placed in slots 618 in core plate 602, only one of which is shown in FIG. 6A. The cavity plate of mold 600 is closed over core plate 602 and the encapsulation material 309 (FIG. 3) injected into mold 600, encapsulating coil 614 to form field coil 304 with magnet wires 303 encapsulated in encapsulation 313 made of encapsulation material 309.

Coil 614 of field coil 304 can be insulated by processes other than encapsulation, such as applying a resin coating to them by using the trickle resin process, applying an epoxy coat to them by dipping the formed coil 614 in a tank of epoxy, a powder coat process where heated coil windings cure powdered epoxy on the coil wires, applying an electrically insulating foam to them, or winding insulating tape, such as electrical insulating tape or epoxy tape, around them. In one type of powder coat process, heated coils are placed in a fluidized bed of epoxy. When the coils are insulated by coating, the coating can be applied to the coils before they are assembled in the stator or after. It should also be understood that the coils may be encapsulated or coated to improve abrasion protection and tracking resistance and the coils further insulated to provide insulation between the coils and the stator core pieces, such as with insulated slot liners or winding insulating tape around the encapsulated or coated coils.

FIG. 7 shows a cross section of stator 400 (FIG. 4C) in which the field coils 700 are insulated with a layer of insulating material 702 such as insulating paper, electrical insulating tape, epoxy tape, or electrical insulating foam. Insulating material 702 is wrapped around the coils of field coils 700 in the area abutting the field laminations, such as return path pieces 402 and pole pieces 404.

Such electrical insulating material, other than electrical insulating foam, is not compliant, so clearances must be left between the insulating material 702 and the field laminations, such as return and pole pieces 402, 404. These clearances result in a degree of looseness of field coils 700 in stator 400. To enhance product life and durability, these clearances need to be eliminated, or at least minimized. To do so, a compliant material 708 (FIG. 7B) is placed between the return path pieces 402 and the field coils 700. Compliant material 708 may illustratively be a foam having a suitable temperature rating. Compliant material 708 may also have adhesive on one or both sides to facilitate retaining it in place during assembly of stator 400 and improve retention of field coils 700 relative to return path pieces 402.

If foam is used as electrically insulating material 702 or compliant material 708, it may illustratively be thermally conductive to enhance heat transfer. In this regard, it may contain fillers such as ceramics to increase thermal conductively. Other types of fillers can be used, such as carbon which is cheaper than ceramic, if suitable for the electrical design of the product.

Figure 8:
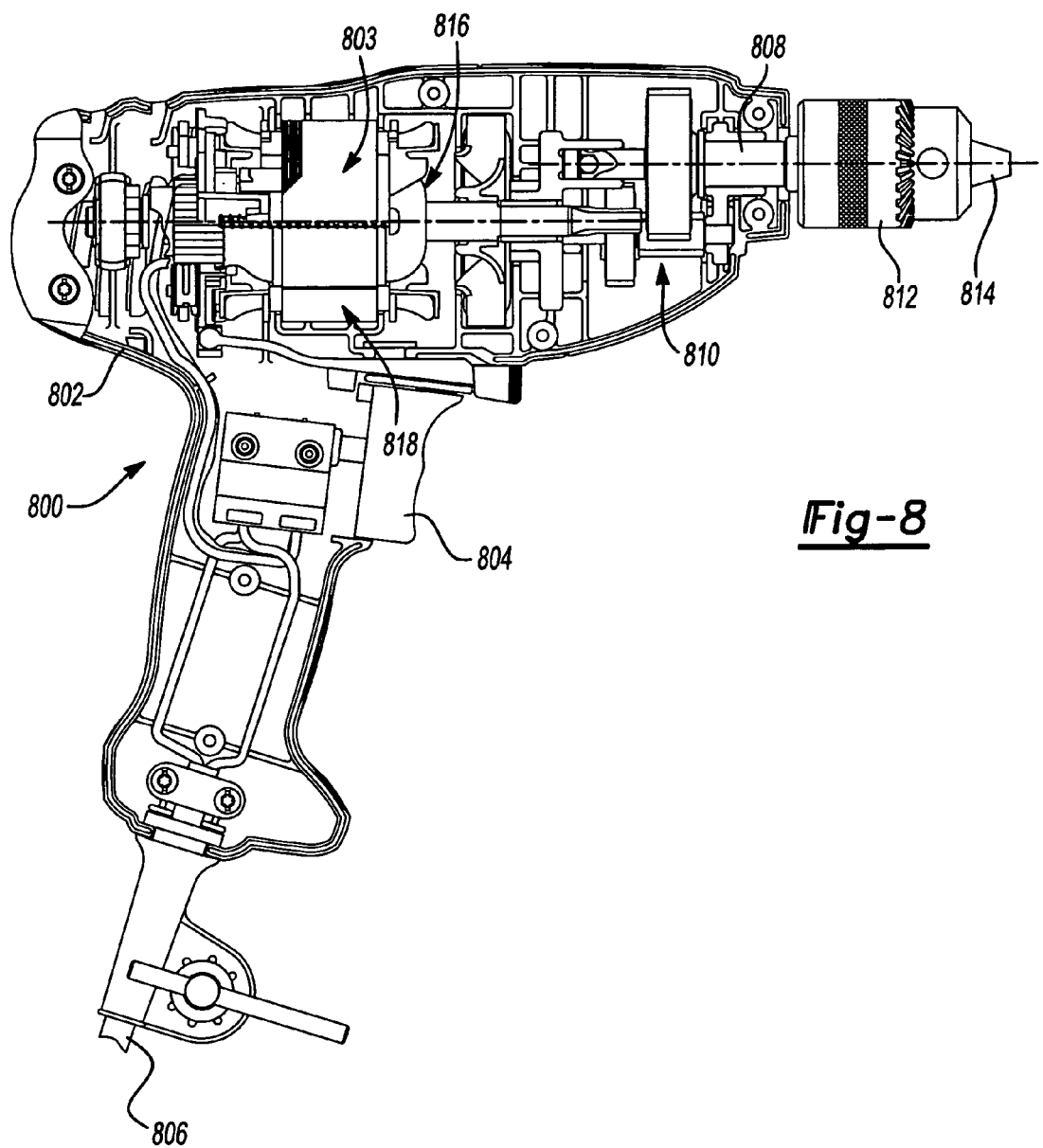
FIG. 8 is a cross-section of a power tool having a stator in accordance with an aspect of the invention.
Figure 9:
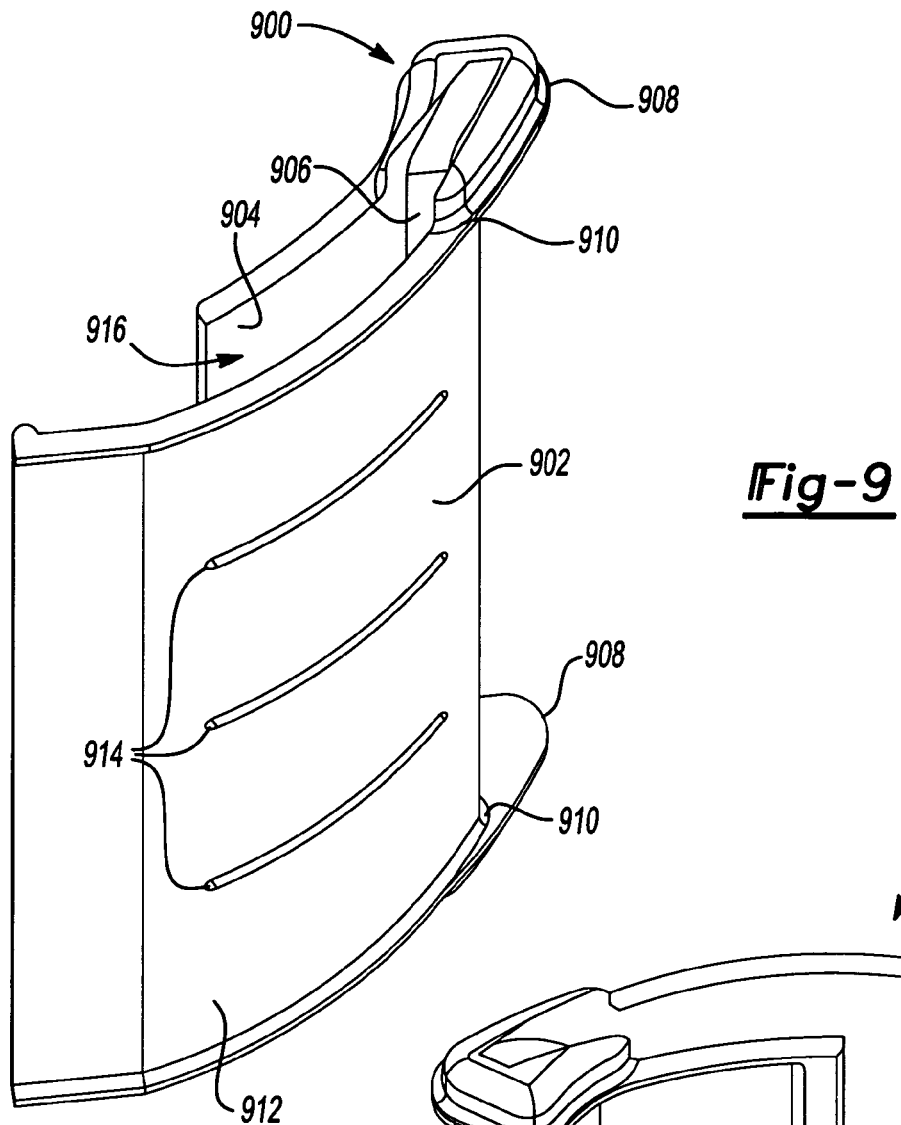
FIG. 9 is a front perspective view of an insulating sleeve for insulating field coils of a stator in accordance with an embodiment of the invention.
Figure 10:
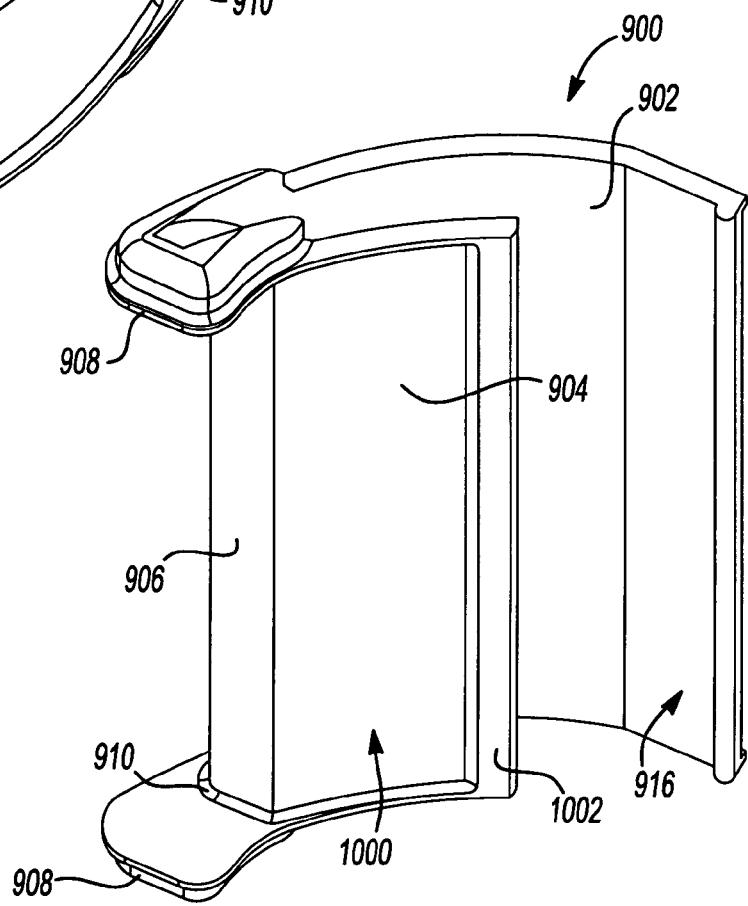
FIG. 10 is a rear perspective view of the insulating sleeve of FIG. 9.

Referring now to FIG. 8, a power tool 800 is shown. Power tool 800 is illustratively a hand-held power tool and is illustrated as a drill, however, any type of power tool may be used in accordance with the present invention. The power tool 800 includes a housing 802 which surrounds a motor 803. An activation member 804 is coupled with the motor and a power source 806, illustratively AC. The motor 803 is coupled with an output 808 via a drivetrain 810. Output 808 includes a chuck 812 having jaws 814 to retain a tool such as a drill bit (not shown). The motor 803 includes an armature 816 and a stator 818 made in accordance with this invention, such as stator 300 or 400 (FIGS. 3 and 4).

Figure 11:
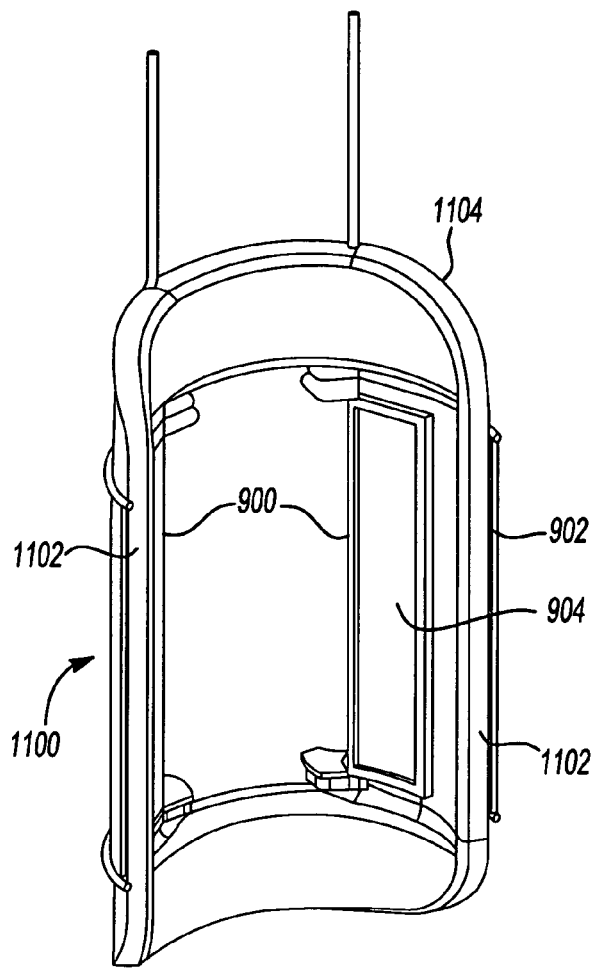
FIG. 11 is a perspective view of a field coil/insulating sleeve assembly using the insulating sleeves of FIGS. 9 and 10.
Figure 12:
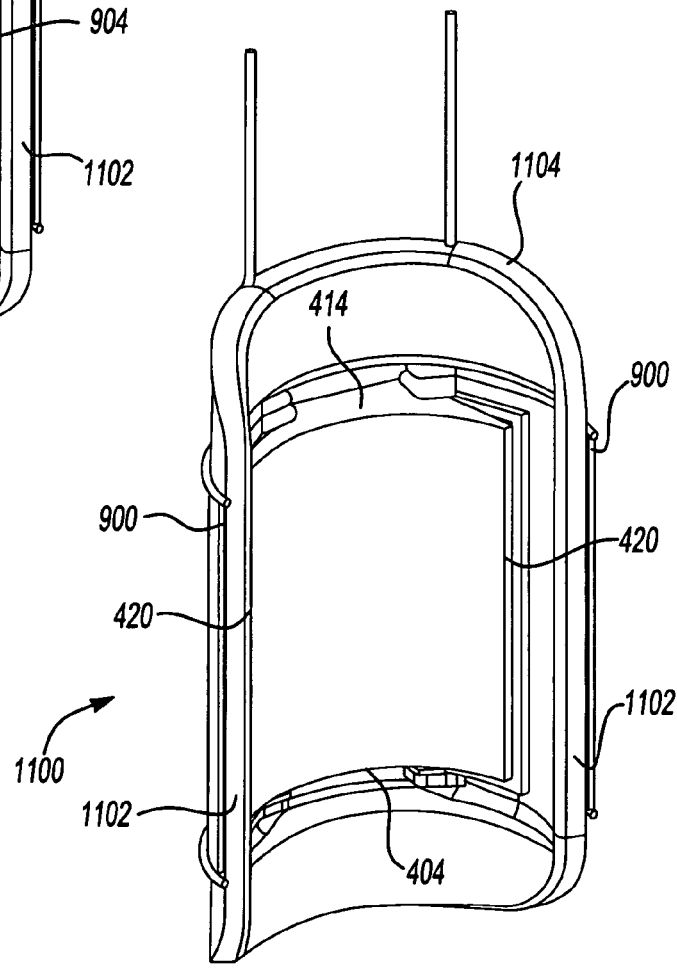
FIG. 12 is a perspective view of the field coil/insulating sleeve assembly of FIG. 11 assembled on a pole piece.

FIGS. 9-12 show an insulating sleeve 900 that can be used as the insulating slot liner 322 (FIG. 3A) and in lieu of encapsulating the field coils, such as field coils 1104 (FIG. 11). For convenience, insulating sleeve 900 will be described with reference to the stator 400 of FIG. 4. Insulating sleeve 900 may illustratively be made of compliant material, such as liquid silicon rubber, and may illustratively be molded. Insulating sleeve 900 includes an outer section 902, inner section 904 and a bight section 906 bridging inner and outer sections 904, 902 at one edge thereof. Locating or centering tabs 908 extend from opposed ends 910 of bight section 906. An outer surface 912 of outer section 902 has laterally extending outwardly projecting compression ribs 914 formed thereon. A pocket 1000 (FIG. 10) may be formed in an outer surface 1002 of inner section 904 for receiving one of the pole tips 420 of pole piece 404 (FIG. 4). Outer and inner sections 902, 904 and bight section 906 of insulating sleeve 900 define a slot 916 in which one of sides 1102 of field coil 1104 (FIG. 11) is received.

The use of insulating sleeve 900 is now described. In assembling the stator 400, two insulating sleeves 900 are placed on field coil 1104 with opposite sides 1102 (FIG. 11) of the field coil 1104 received in the slots 916 of the respective insulating sleeves 900 to form field coil/sleeve assembly 1100. The width of the outer section 902 of the insulating sleeve 900 may illustratively be the same or preferably slightly greater than the width of the side 1102 of the field coil 1104 that is received in the slot 916 of the insulating sleeve 900 to insulate the field coil 1104 from an inner surface of the return path piece 402 that is adjacent the side 1102 of the field coil 1104 when the field coil 1104 is assembled in stator 400. The width of the inner section 904 of the insulating sleeve 900 may illustratively be the same or preferably slightly greater than the width of the section of the pole tip 420 of pole piece 404 that is adjacent the side of the field coil 1104 when the field coil 1104 is assembled in stator 400 to insulate the field coil from the surface of the pole tip 420 adjacent the side of the field coil 1104.

A field coil/sleeve assembly 1100 is then placed over the neck 414 of each of the pole pieces 404 and the pole pieces 404 mated with the return path pieces 402. The pole tips 420 of each pole piece 404 are received in the pockets 1000 (FIG. 10) of the respective insulating sleeves 900 disposed over the opposite sides 1102 of that field coil 1104 to aid in retaining the field coil/sleeve assembly 1100 in place. Centering tabs 908 of the insulating sleeves 900 center the pole piece 404 and the field coil/sleeve assembly 1100 with respect to each other. Compression ribs 914 compress against respective inner surfaces 434 (FIG. 4B) of respective return path pieces 402 and aid in securing the field coil/sleeve assembly in place in stator 400 so that the field coil/sleeve assembly 1000 will not vibrate loose during operation of the motor in which it is used, such as in power tool 800.

Turning to FIG. 18, an insulating sleeve 1800 that is a variation of insulating sleeve 900 is shown. Insulating sleeve 1800 is also made of complaint material, such as silicon rubber, but is extruded instead of molded. Insulating sleeve 1800 includes an outer section 1802, an inner section 1804 and a bight section 1806 bridging inner and outer sections 1804, 1802 at one edge thereof. An outer surface 1808 of outer section 1802 has outwardly projecting compression ribs 1810 formed thereon that extend across outer section 1802. Outer and inner sections 1802, 1804 and bight section 1806 define a slot 1812 in which one side of a field coil, such as field coil 1104 (FIG. 11) is received. Compression ribs 1810 allow tuning adjustments in the tool used to extrude insulating sleeve 1800 so that the retention force on the field coil, such as field coil 1104, when it is assembled as part of a stator such as stator 400 can be optimized.

Figure 5E:
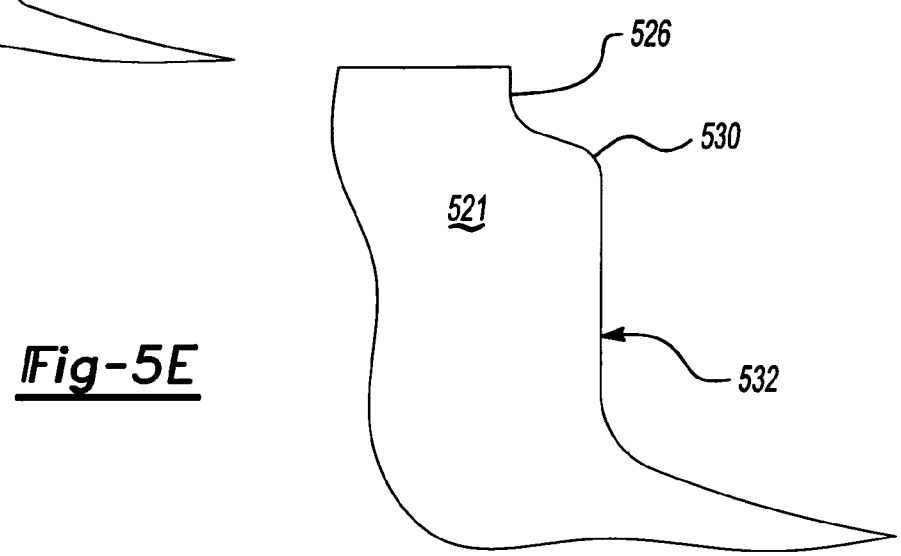
Figure 5F:
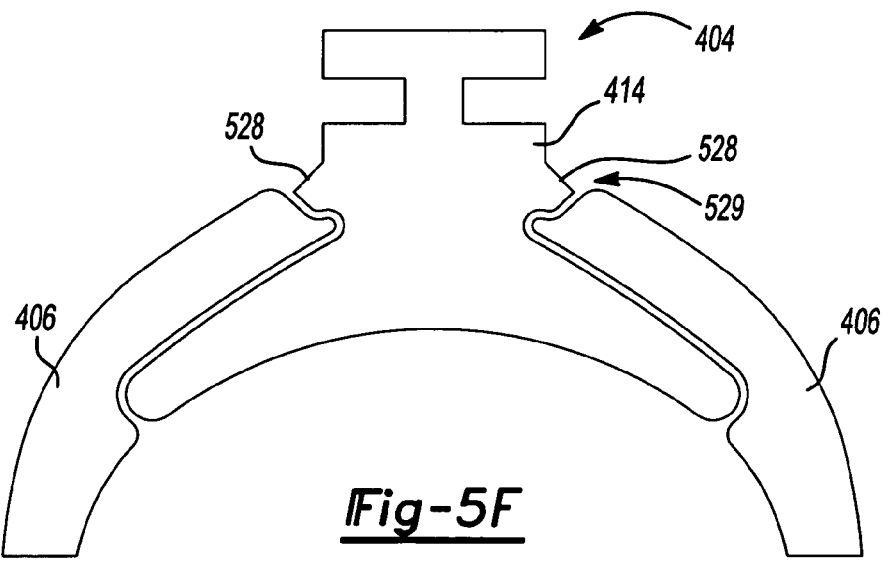
FIG. 5F is a side section view of a pole piece and field coil with portions of the pole piece staked over the field coil.

With reference to FIG. 5E, edges 526 of radially outer section 521 of pole tip section 522 are recessed and have a radius at 530. However, edges 526 are not formed to include lips 528 (FIG. 5D) so that a radially extending outer surface 532 of radially outer section 521 of pole tip portion 522 presents a smooth wall free of detents, lips or the like. This improves assembly when the field coils are insulated with compliant insulating sleeve 900 and insulating slots liners made of paper such as embodiments of insulating slot liners 322 (FIG. 3A), 1300 and 1600 (described below.) The radius 530 and the smooth wall presented by surface 532 helps prevent displacing the insulating sleeve 900 and insulating slot liners 1300, 1600 from their proper position around the field coils.

As mentioned, insulating sleeve 900 may illustratively be made of compliant material, such as liquid silicon rubber, and may illustratively be used in lieu of encapsulating the field coils. This provides the benefit of not having to insert mold the field coils with an encapsulant. Insulating sleeves 900 can be molded separately at a rate that applicants expect will be much faster than the rate at which the field coils can be wound and the mold(s) used to mold the insulating sleeves will likely be able to have more cavities than the mold(s) used to insert mold the field coils.

FIGS. 13-15 show an insulating slot liner 1300 in accordance with an embodiment of the invention that can be used as insulating slot liner 322 (FIG. 3A) and in lieu of encapsulating the field coils. Insulating slot liner 1300 includes a substrate 1302 made of insulative material, such as insulating paper, insulating plastic film, or the like having an outer section 1301 and an inner section 1303. Illustrative materials of which substrate 1302 can be made include various grades of Nomex® paper or tape, polyester/glass fiber, polyester/rag, Nomex®/polyester, or polyester/Dacron® laminates. An inner adhesive strip 1304 is disposed on an inner surface 1306 of outer section 1301 of substrate 1302 and an outer adhesive strip 1308 is disposed on an outer surface 1310 of inner section 1303 of substrate 1302. An outer surface 1404 (FIG. 14) of outer section 1301 may also have an adhesive strip (not shown) disposed thereon as may an inner surface 1406 of inner section 1303. Inner and outer adhesive strips 1304, 1308 may illustratively include non-stick overhanging cover strips 1400 (FIG. 14) that can be easily removed from inner and outer adhesive strips 1304, 1308 during assembly. One or both of opposed upper and lower edges 1312 of substrate 1302 may illustratively be folded over cuffed edges.

Insulating slot liner 1300 may illustratively be "C" or "U" shaped and may illustratively be preformed so that it fits the contours of the field coils, such as field coils 614, and radially outer surfaces 1500 (FIG. 15) of pole tips 420 of pole pieces 404 of stator 400 that abut field coils 614 and inner surfaces 1502 of return path pieces 402. This aids in adhesive retention such as between inner adhesive strip 1304 and field coil 614 and/or between outer adhesive strips 1308 and the surfaces 1500 of pole tips 420 of pole pieces 404. This also aids in assembly. Insulating slot liner 1300 may illustratively be sized so that a distal edge 1505 (FIG. 15) of outer section 1301 extends beyond a distal edge 1506 of field coil 614 and a distal edge 1508 of inner section 1303 extends beyond an outer edge 1510 of pole tip 420. In a 59 mm. O.D. stator, this distance is illustratively a minimum of 2 mm. Cuffed edge(s) 1312 of substrate 1302 extend over axial edge(s) 436 (FIG. 4B) of return path piece 402 and axial edge(s) 438 (FIG. 4A) of pole piece 404 to locate insulating slot liner 1300 on return path piece 402 and pole piece 404 and, when both opposed edges 1312 of substrate 1302 are cuffed, to capture insulating slot liner 1300 on return path piece 402 and pole piece 404.

The use of insulating slot liners 1300 is now described. In assembling the stator 400, cover strips 1400 are removed from the inner adhesive strips 1304 of two insulating slot liners 1300 which are then placed on field coil 614 with the opposites sides of the field coil 614 received in respective ones of the insulating slot liners 1300. If an adhesive strip is provided on inner surface 1406 of inner section 1303, its cover strip is removed before placing the insulating slot liner 1300 over the side of field coil 614. Inner adhesive strip 1304 secures the insulating slot liner 1300 to the side of the field coil 614 over which the insulating slot liner 1300 was placed. The cover strips 1400 are then removed from outer adhesive strips 1308 of the insulating slot liners 1300 and field coil/insulating slot liner assembly 1514 (FIG. 15) placed over the neck 414 of a pole piece 404, bringing the outer adhesive strips 1308 of the insulating slot liner 1300 into contact with the surfaces 1500 of the pole tips 420 of the pole piece 404 so that the adhesive on the outer adhesive strips 1308 contacts the surfaces 1504 of the pole tips 420. The return path pieces 402 are then mated with the pole pieces 404. If an adhesive strip is provided on the outer surface 1404 of outer section 1301 of insulating slot liner 1300, its cover strip is removed before the return path piece 402 that will abut that insulating slot liner 1300 is mated to the pole piece 404. It should be understood that while only one insulating slot liner 1300 is shown in FIG. 15, all of field coils 614 would be insulated with insulating slot liners 1300, illustratively, two insulating slot liners 1300 for each field coil 614.

Inner adhesive strip 1304 may illustratively be a pliable adhesive strip, such as a foam or gel strip ranging from 0.001" to 0.250" in thickness, to take up clearances and fill into component contours of field coil 614 to provide a robust retention force. Outer adhesive strip 1308 may also be a pliable adhesive strip.

Outer adhesive strip 1308 may illustratively be sized so that there is a gap between its edges and the edges of substrate 1302, shown representatively at 1316. That is, outer adhesive strip 1308 is smaller than the outer surface 1310 on which it is disposed. By having a gap between the edges of substrate 1302 and outer adhesive strip 1308, that is, sizing outer adhesive strip 1308 so that it is smaller than the outer surface 1310 on which it is disposed, the adhesive on outer adhesive strip is completely covered by inner surface 1502 of return path piece 402 when insulating slot liner 1300 is assembled in stator 400. This minimizes or eliminates any dust or chips contacting the adhesive on outer adhesive strip 1308 and being retained thereon. Similarly, inner adhesive strip 1304 may illustratively be sized so that it is smaller than the inner surface 1306 of substrate 1302 on which it is disposed. It should be understood that the insulating slot liner 1300 could have multiple inner and outer adhesive strips 1304, 1308.

The inner and outer adhesive strips 1304, 1308 of the insulating slot liners 1300 serve three purposes. They retain the field coils 614 to the return path pieces 402 and pole pieces 404 and prevent slippage between field coils 614 and the return path pieces 402 and pole pieces 404. They act as a secondary support to hold together the windings of field coil 614. They also act as a secondary support to hold together the return path piece 402 and the pole piece 404.

The thickness of the substrate 1302 of insulating slot liner 1300 may illustratively be optimized to take up clearances thus keeping the assembly of the field coils 614 and the return path and pole pieces 402, 404 tight and keeping pressure on inner and outer adhesive strips 1304, 1308 as they contact field coils 614 and the inner surfaces 1502 of return path pieces 402, respectively. In a 59 mm O.D. stator 400, the optimum thickness of substrate 1302 is in the range of 0.002" to 0.030". The distal edge 1505 of outer section 1301 may also be folded over as shown at 1402 in FIG. 14. Doing so helps take up clearances, increases the interference in a localized area for a tight fit in that localized area. It may also allow a thinner, better conforming, lower cost paper to be used for substrate 1302.

Certain materials, such as some types of insulated paper, that can be used for substrate 1302, have a smooth surface on one side and a rough surface on the other side. For these materials, insulating slot liner 1300 may illustratively be formed so that the smooth surface is the outer surface of substrate 1302 that contacts the surfaces 1500 of pole tips 420 and inner surfaces 1502 of return path pieces 402 to facilitate assembly.

As shown in FIG. 15, field coil 614 could in an alternative embodiment be insulated with a full wrap of insulated material, such as insulated paper, as shown in phantom at 1512. This reduces the likelihood of the insulated paper curling up into the armature of the motor in which stator 400 is used and prevents slippage of the insulated paper during assembly.

Figure 16A:
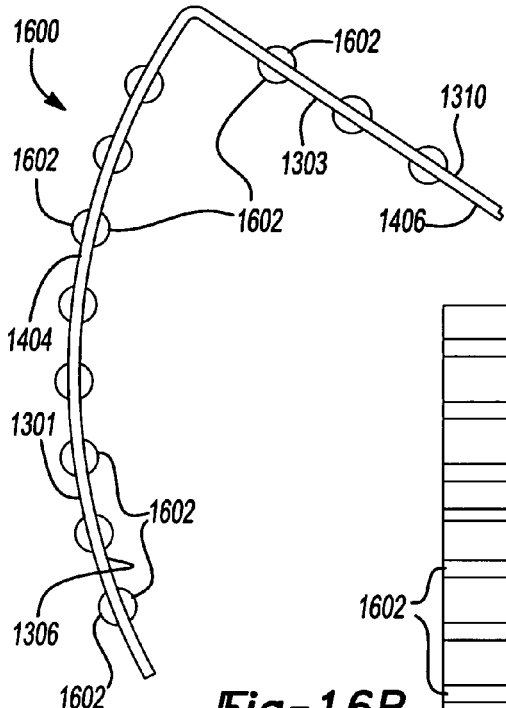
FIGS. 16A and 16B are side and front view of an insulating slot liner in accordance with an embodiment of the invention that is a variation of the insulating slot liner of FIGS. 13 and 14.
Figure 16B:
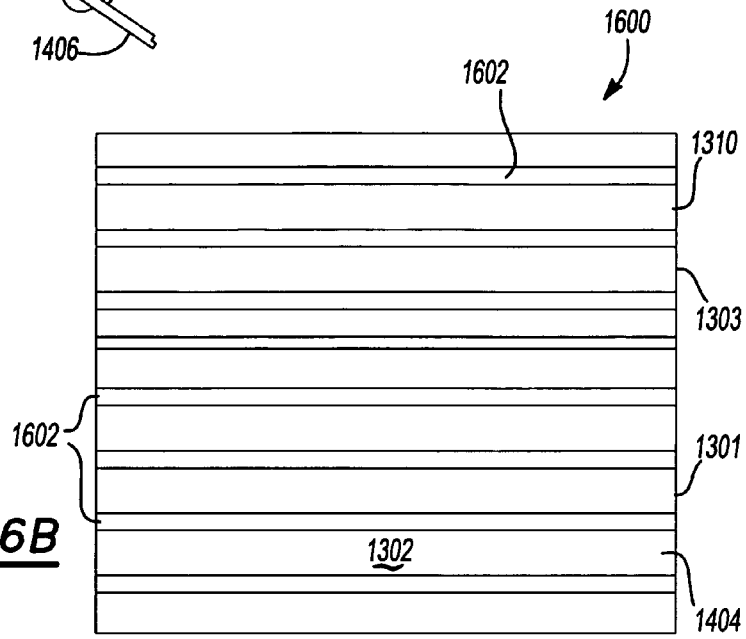

FIGS. 16A and 16B show an insulating slot liner 1600 which is a variation of insulating slot liner 1300. Like elements will be identified with the same reference numbers and only the differences will be described. Insulating slot liner 1600 includes compliant material 1602 disposed on inner and outer surfaces 1406, 1310 of inner section 1303 and inner and outer surfaces 1306, 1404 of outer section 1301 of substrate 1302. The compliant material 1602 provide an interference between the substrate 1302 of the insulating slot liner 1600, the field coil, such as field coil 614 (FIG. 15), and the return path pieces 402 and pole pieces 404. It should be understood that compliant material 1602 can be disposed on one as opposed to both of the inner and outer surfaces 1306, 1404 of outer section 1301 of substrate 1302 and on one as opposed to both of the inner and outer surfaces 1406, 1310 of inner section 1303 of substrate 1302. It should also be understood that compliant material 1602 can be strips of complaint material, beads or other shapes. It should further be understood that complaint material 1602 can be any suitable complaint material, such as compliant polymers such as silicon, resins, foams or epoxies.

Alternatively or in addition to encapsulating the field coils and or using insulating slot liners, the stator core pieces 306 or appropriate portions of the stator core pieces can be encapsulated or covered with an encapsulating or coating material, such as thermoplastics and thermosets, which may illustratively be thermally conductive or not. By way of example and not of limitation, the stator core pieces 306 (or appropriate portions of them) can be covered with an epoxy coating that is either sprayed on or applied using an electrostatic coating process. With reference to FIG. 19, a layer 1900 of insulation is applied to surfaces 1902 of pole tip portion 522 of pole piece 404 and to radially inner facing surfaces 1904 of return path pieces 402 (only one of which is shown in FIG. 19).

Referring to FIGS. 20 and 21, an insulating slot liner 2000 that is a variation of insulating sleeve 1300 (FIG. 13) is shown. Insulating slot liner 2000 is made of a layer of insulation material, such as one of the above referenced insulation papers, having both sides or surfaces coated with a thin layer of a B-stage thermosetting adhesive, such as VonRolllsola 6001 (phenolic) or 6351 (epoxy). A B-stage thermosetting adhesive is one that is dry to the touch and not tacky and is in a state to be cured by the application of heat. An insulating slot liner 2000 is wrapped around each portion of a field coil that is disposed between a pole piece and a return path piece mated to that pole piece. Insulating slot liner 2000 is illustratively formed with creases to contour around the field coil. Additionally, for lower temperature applications, a thermoplastic adhesive could be used, such as VonRolllsola HS2400. Moreover, pre-laminated films with adhesives could also be used, such as 3M bonding film 583 or 588 (heat or solvent cure), or 3 M ENPE-365 (UV light cure). The film containing the resin is itself adhered to the insulation paper used for the slot liner.

In assembly, insulating slot liner 2000 is wrapped around the appropriate portion of the field coil, such as field coil 2100 (FIG. 21), and secured with a thin tape, such as 0.025 mm thick acrylic adhesive tape, to form insulated field coil 2102. The insulated field coil 2102 is then placed over the neck 414 of a pole piece 404 (FIG. 4). Preferably, there will be enough pressure between the insulating slot liner 2000 and pole piece 404 to hold the two together during assembly of stator 400. If not, a temporary adhesive may be used, such as thin double-sided taped, one or two part adhesives, and UV light cure adhesives.

The thickness of the material, such as insulating paper, used for insulating slot liner 2000 is chosen so that there is a slight pressure between field coil 2100, the insulating slot liner 2000, and the return path pieces 402 and the pole pieces 404 after final assembly. This will hold the field coil 2100 in the proper position until the B-stage adhesive is activated and cured. If there is not sufficient pressure, a temporary adhesive can be used until the B-stage adhesive is cured. The B-stage adhesive on both sides of the material used for insulating slot liner 2000 adheres to both the field coil 2100 and the return path pieces 402 and the pole pieces 404, and secures them to each other. This facilitates the motor in which the stator 400 is used withstanding heavy vibrations that are seen in some motor/power tool applications. The B-stage adhesive also acts to bond the individual laminations of the return path pieces 402 and pole pieces 404 together.

Figure 22:
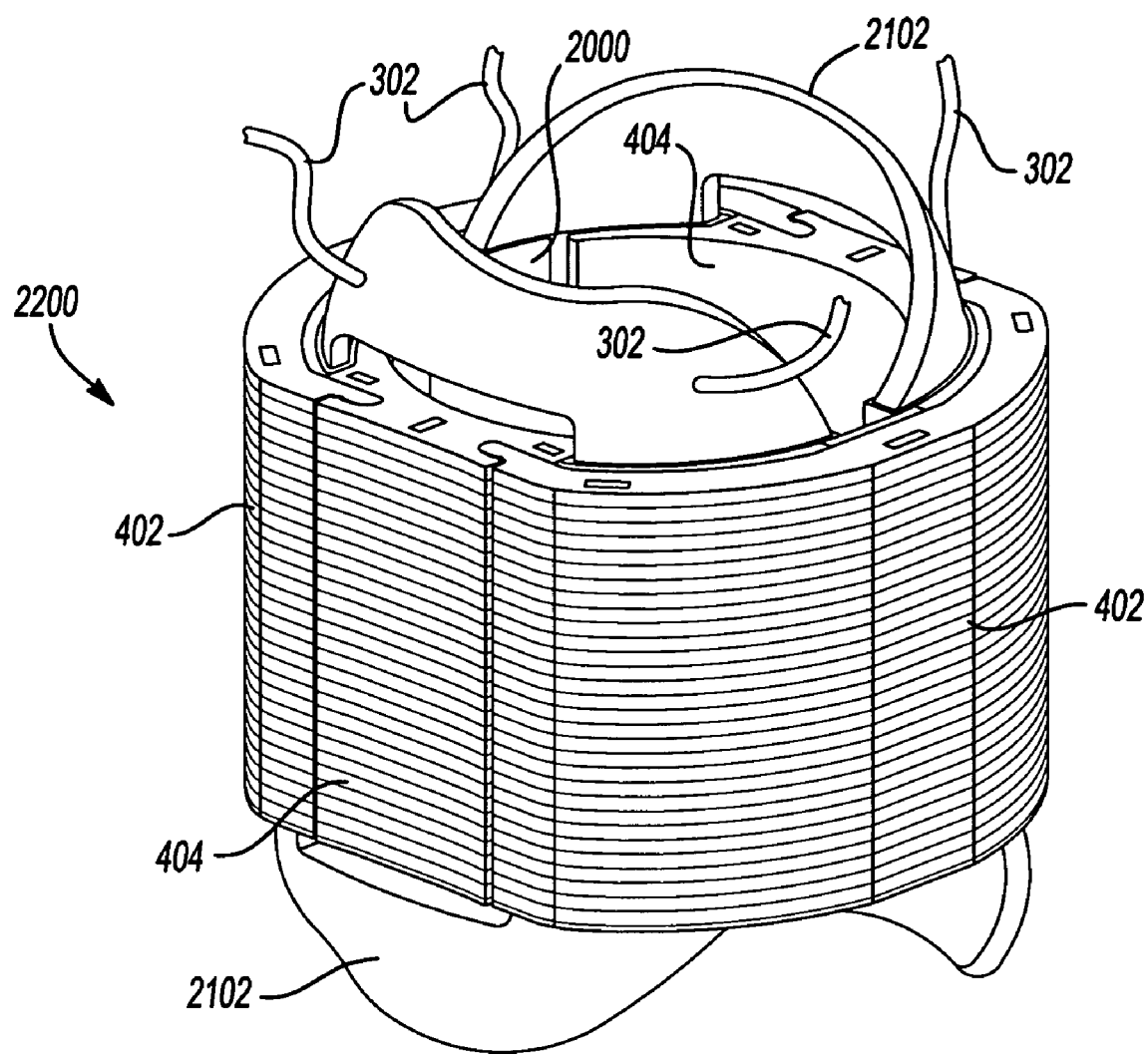
FIG. 22 is a perspective view of a field having the field coil of FIG. 21.

FIG. 22 shows a field (stator) made in accordance with this invention utilizing the insulated field coils 2102. Elements in common with those described above with reference to previously discussed figures are identified with the same reference numerals used for those elements in those figures. In the illustrative embodiment of FIG. 22, after field coils 2102 are placed on the necks of pole pieces 404 and pole pieces 404 mated with return path pieces 402, field coils 2102 are coated with epoxy using one of the processes described above. Illustratively, field coils 2102 are coated with epoxy by placing the field 2102 in a fluidized bed of epoxy and heating field coils 2102, such as by running electrical current through them.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An electric motor, comprising a stator and an armature in the stator, the stator including:
    a. separately formed pole pieces and return path pieces mated together;
    b. field coils disposed on the pole pieces between the pole pieces and the return path pieces mated to the pole pieces; and
    c. each portion of each field coil disposed between the pole piece on which the field coil is disposed and one of the return path pieces mated to that pole piece wrapped with an insulating slot liner made of a layer of insulation material with at least one of a B-stage thermosetting adhesive and a thermoplastic adhesive on at least one surface, the adhesive activated by heat during the assembly of the stator and bonding the insulation material to the field coil and the pole piece and return path piece to secure them together.

2. The motor of claim 1 wherein the insulation material has the adhesive on front and back surfaces.

3. A hand-held power tool, comprising a housing surrounding a motor, the motor including a stator and an apparatus in the stator, the stator including:
    a. separately formed pole pieces and return path pieces mated together;
    b. field coils disposed on the pole pieces between the pole pieces and the return path pieces mated to the pole pieces; and
    c. each portion of each field coil disposed between the pole piece on which the field coil is disposed and one of the return path pieces mated to that pole piece wrapped with a insulating slot liner made of a layer of insulation material with at least one of a B-stage thermosetting adhesive and a thermoplastic adhesive on at least one surface, the adhesive activated by heat during the assembly of the stator and bonding the insulation material to the field coil and the pole piece and return path piece to secure them together.

4. The hand-held power tool of claim 3 wherein the insulation material has the adhesive on front and back surfaces.

* * * * *